US008358941B2

(12) United States Patent
Nakazato et al.

(10) Patent No.: US 8,358,941 B2
(45) Date of Patent: Jan. 22, 2013

(54) MANAGEMENT DEVICE OF AN IMAGE FORMING APPARATUS

(75) Inventors: Yasushi Nakazato, Tokyo (JP); Kohji Ue, Kanagawa (JP); Jun Yamane, Kanagawa (JP); Osamu Satoh, Kanagawa (JP); Masahide Yamashita, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/317,255

(22) Filed: Oct. 13, 2011

(65) Prior Publication Data

US 2012/0033243 A1 Feb. 9, 2012

Related U.S. Application Data

(63) Continuation of application No. 12/219,905, filed on Jul. 30, 2008, now Pat. No. 8,064,782.

(30) Foreign Application Priority Data

Aug. 3, 2007 (JP) ................................ 2007-203206

(51) Int. Cl.
*G03G 15/00* (2006.01)
*G06F 3/12* (2006.01)
*G06F 11/30* (2006.01)

(52) U.S. Cl. ........... 399/9; 358/1.13; 358/1.15; 702/185

(58) Field of Classification Search .................. 399/8, 9, 399/10, 18; 358/1.14, 1.15, 1.16, 1.9; 702/185
See application file for complete search history.

(56) References Cited

U.S. PATENT DOCUMENTS

| | | | | |
|---|---|---|---|---|
| 7,110,917 | B2 | 9/2006 | Matsuura et al. | 702/185 |
| 7,184,674 | B2 | 2/2007 | Satoh et al. | 399/34 |
| 7,203,431 | B2 | 4/2007 | Shoji et al. | 399/9 |
| 7,327,962 | B2 | 2/2008 | Shoji et al. | 399/9 |
| 2004/0252324 | A1 | 12/2004 | Ohta | 358/1.14 |
| 2005/0002054 | A1 | 1/2005 | Shoji et al. | 358/1 |
| 2005/0063714 | A1 | 3/2005 | Kinoshita et al. | 399/27 |
| 2005/0100374 | A1 | 5/2005 | Satoh et al. | 399/350 |
| 2005/0154562 | A1 | 7/2005 | Matsuura et al. | 702/185 |

(Continued)

FOREIGN PATENT DOCUMENTS

| | | |
|---|---|---|
| JP | 59-95269 | 6/1984 |
| JP | 05-100517 | 4/1993 |

(Continued)

OTHER PUBLICATIONS

"Statistical Pattern Determination in Information Geometry", Mathematical Science No. 489, Mar. 2004.

(Continued)

*Primary Examiner* — David Porta
*Assistant Examiner* — Faye Boosalis
(74) *Attorney, Agent, or Firm* — Harness, Dickey & Pierce, P.L.C.

(57) ABSTRACT

A management device for an image forming apparatus including a status data collection unit where multiple types of status data are received from the image forming apparatus and stored in a status database, a target data creation unit where multiple types of target data are created based upon the multiple types of status data, a first stage determination unit where the multiple types of target data are identified as being above or below reference values set for each type, and a second stage determination unit where a weight value set for each status data type is attached to the determination results of the multiple types of status data of the first stage determination unit and as a whole of the multiple types of status data determined with majority logic for abnormal occurrence prediction.

14 Claims, 23 Drawing Sheets

U.S. PATENT DOCUMENTS

| | | | | |
|---|---|---|---|---|
| 2005/0157327 | A1 | 7/2005 | Shoji et al. | 358/1.14 |
| 2005/0280809 | A1 | 12/2005 | Hidai et al. | 356/237.3 |
| 2005/0281596 | A1 | 12/2005 | Nakagawa et al. | 399/350 |
| 2005/0286916 | A1 | 12/2005 | Nakazato et al. | 399/16 |
| 2006/0182451 | A1 | 8/2006 | Shoji et al. | 399/9 |
| 2006/0294252 | A1 | 12/2006 | Shoji et al. | 9/230 |
| 2007/0127934 | A1 | 6/2007 | Shoji et al. | 399/9 |
| 2007/0258723 | A1 | 11/2007 | Nakazato et al. | 399/9 |
| 2008/0068639 | A1 | 3/2008 | Satoh et al. | 358/1.14 |
| 2008/0075476 | A1 | 3/2008 | Nakazato et al. | 399/15 |

FOREIGN PATENT DOCUMENTS

| | | |
|---|---|---|
| JP | 05-164800 | 6/1993 |
| JP | 05-281809 | 10/1993 |
| JP | 05-323740 | 12/1993 |
| JP | 06-289717 | 10/1994 |
| JP | 07-036323 | 2/1995 |
| JP | 07-104616 | 4/1995 |
| JP | 07-104619 | 4/1995 |
| JP | 08-137344 | 5/1996 |
| JP | 2621879 | 4/1997 |
| JP | 11-296027 | 10/1999 |
| JP | 2000-089623 | 3/2000 |
| JP | 2000-270141 | 9/2000 |
| JP | 2001-175328 | 6/2001 |
| JP | 2001-356655 | 12/2001 |
| JP | 2003-215986 | 7/2003 |
| JP | 2004-219617 | 8/2004 |
| JP | 2005-017874 | 1/2005 |
| JP | 2005-157679 | 6/2005 |

OTHER PUBLICATIONS

Abstract of JP 64-081080 published Mar. 27, 1989.

Notice of Rejection by the Japanese Patent Office dated May 1, 2012 for corresponding Japanese Patent Application No. 2007-303505.

* DEVELOPMENT POTENTIAL = ELECTRIC CHARGE OF PHOTORECEPTOR SURFACE — ELECTRIC POTENTIAL OF DEVELOPMENT ROLLER DETERMINED BY ELECTRIC CHARGE BIAS, EXPOSURE QUANTITY & DEVELOPMENT BIAS

CHANGE OF REFERENCE CHARACTERISTIC LINE DUE TO MILD SURFACE CONTAMINATION (SOLID LINE)

FIG.19

PREDICTION DETERMINATION REFERENCE TABLE

| TARGET DATA No. | REFERENCE VALUE b | WEIGHT α | TENDENCY DETERMINATION RESULT sgn |
|---|---|---|---|
| 1 | 0.12 | 1.15 | |
| 2 | 1.154 | 0.025 | |
| 3 | 0.0021 | 1.126 | |
| 4 | 5.31 | 3.442 | |
| ⋮ | ⋮ | ⋮ | |
| 31 | 3.211 | 0.323 | |

MANAGEMENT DEVICE OF AN IMAGE FORMING APPARATUS

CROSS-REFERENCE TO RELATED APPLICATIONS

This application is a continuation of and claims priority under 35 U.S.C. §§120/121 to U.S. patent application Ser. No. 12/219,905, filed on Jul. 30, 2008 now U.S. Pat. No. 8,064,782, which claims the benefit of Japanese Patent Application No. 2007-203206, filed on Aug. 3, 2007. The disclosures of each of the above applications are incorporated herein by reference.

BACKGROUND OF THE INVENTION

1. Field of the Invention

The present invention generally relates to a management device of an image forming apparatus, and more specifically, to a management system of an image forming apparatus that uses an electro-photographic method, in which an electrostatic latent image is formed via projection of image light upon an electrically charged surface of a photoreceptor, which latent image is then developed and transferred to paper via an intermediate transfer body. The management system includes the management device which advises the user of various statuses/conditions regarding the need to change or replenish consumable supplies.

2. Description of the Related Art

Conventionally, there are multiple apparatuses that achieve service operation efficiency by predicting abnormal occurrences based upon status information of the image forming apparatus. According to the system of Japanese Laid-Open Patent Application No. 2003-215986, abnormal occurrences are predicted based upon the actual number of occurrences of anomalies. According to the apparatus and diagnostic method of Japanese Laid-Open Patent Application No. 5-164800, abnormal occurrence information of the copying unit and status information at the time of the abnormal occurrence are collected on a server and with statistical processing the common factor among specific anomalies is identified. According to the system and method of Japanese Laid-Open Patent Application No. 2001-175328, determination of the factor behind abnormal occurrences is determined by the integration of information from the mounted components such as the sensor or counter of the copying unit.

Japanese Laid-Open Patent Application No. 2003-215986 discloses that the types of abnormal occurrences that can be predicted are limited due to the information obtained being confined to the number of anomalies. Japanese Laid-Open Patent Application No. 5-164800 discloses that an increase in network work load occurs because the information being obtained from the copying unit is sent to a server via a network. Also, there is an increase in system configuration cost due to the need of a server capable of handling the work load of collection and processing of information from the multitude of copying units that are on the market. Japanese Laid-Open Patent Application No. 2001-175328 discloses that the execution of abnormal occurrence prediction within the copying unit achieves a small work load on the management system but the use of neural networks or Bayesian inference and such, with large calculation work loads, for abnormal occurrence determination give rise to the possible delay of the other operations of the copying unit such as the delay of image processing, mechanical control, and loss of speed.

SUMMARY OF THE INVENTION

Accordingly, embodiments of the present invention may provide a novel and useful management device of an image forming apparatus solving one or more of the problems discussed above.

More specifically, the embodiments of the present invention may provide a management device for an image forming apparatus that identifies the indicators that may lead to abnormal occurrence, has a small calculation work load for this task, and can increase the reliability of prediction.

One aspect of the present invention may be to provide a management device for an image forming apparatus comprising a status data collection unit that receives and collects multiple types of status data from the image forming apparatus and stores the data in a status database; a target data creation unit for multiple types of target data for abnormal occurrence prediction based upon the multiple types of status data; a first stage determination unit that identifies whether the target data value from the multiple types of target data is below or exceeds the reference value set for the corresponding type of target data; and a second stage determination unit that identifies abnormal occurrence prediction wherein a weight value set for each type of status data is attached to the determination results for the corresponding type of status data by the first stage determination unit and from the multiple types of status data as a whole determines abnormal occurrence prediction by majority logic.

In the above-mentioned management device for an image forming apparatus according to an embodiment of the present invention, the image forming apparatus may have a color printer.

In the above-mentioned management device for an image forming apparatus according to an embodiment of the present invention, the image forming apparatus may also have a color scanner.

In the above-mentioned management device for an image forming apparatus according to an embodiment of the present invention, the first stage determination unit may employ an determination apparatus with simple data processing such as a stamp determination apparatus and achieve sufficient precision while holding down calculation work load. Notification of abnormal occurrence prediction is executed and thus, according to the contents of the notification, early action can be taken to prevent abnormal occurrence.

In the above-mentioned management device for an image forming apparatus according to an embodiment of the present invention, the indication of possible image concentration anomaly (color concentration anomaly) due to cleaning insufficiency or cleaning insufficiency prediction indication is also identified. Data showing cleaning insufficiency prediction indication are outputted and the determination reference used by the first stage determination unit can be adjusted with the first stage update part and the weight value of the second stage determination unit can be adjusted with the second stage update part.

Other objects, features, and advantages of the present invention will become more apparent from the following detailed description when read in conjunction with the accompanying drawings.

BRIEF DESCRIPTION OF THE DRAWINGS

FIG. 19 is a chart illustrating one example of the weight value attached to target data when calculating reference value b and prediction indication value F used for abnormal occurrence tendency determination of target data in abnormal occurrence prediction determination;

A DETAILED DESCRIPTION OF THE PREFERRED EMBODIMENTS

A description is given below, with reference to FIG. 1 through FIG. 23 of embodiments of the present invention.

Figure 1:
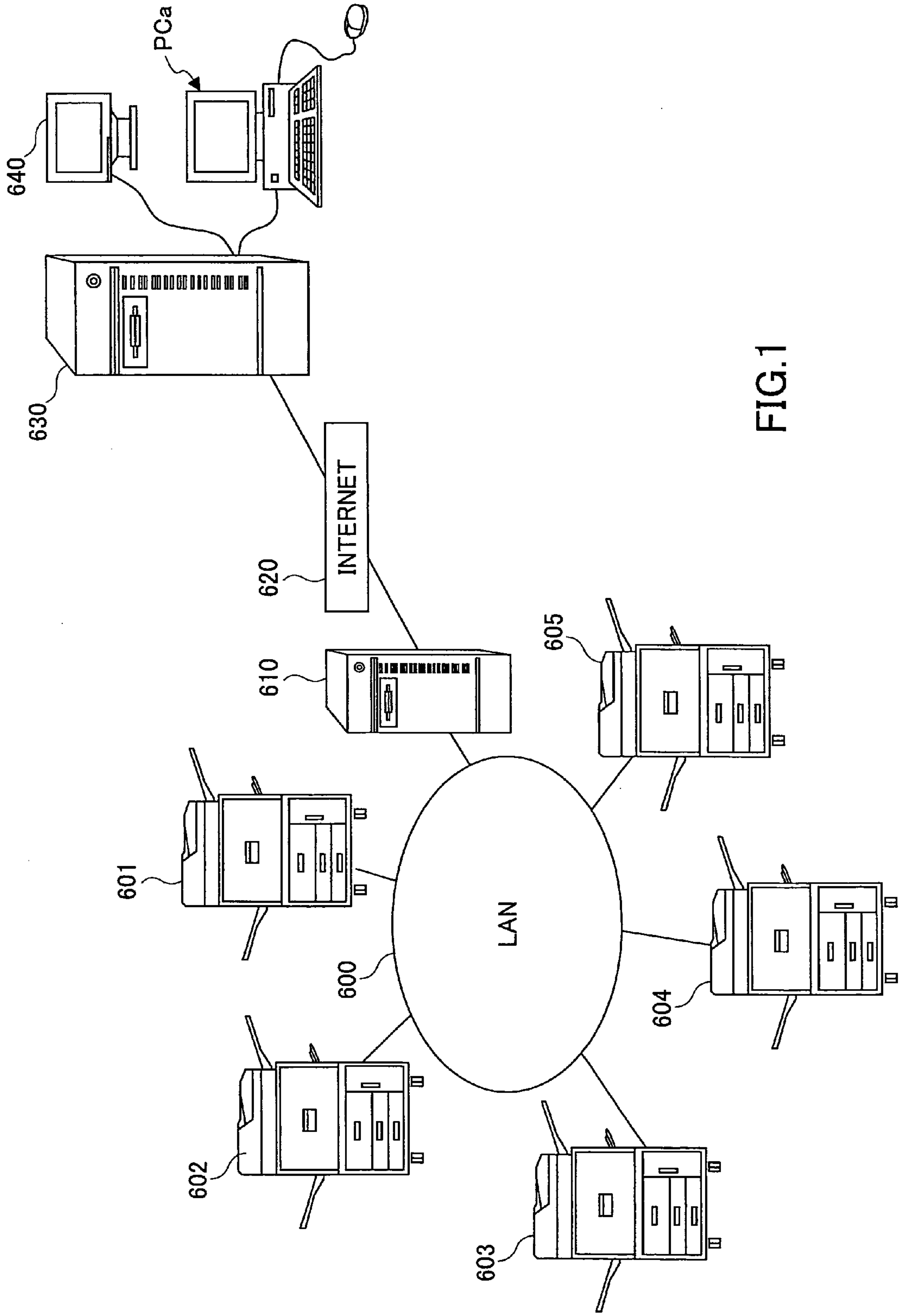
FIG. 1 is a block diagram illustrating an overview of the management system of example 1 of an embodiment of the present invention.

FIG. 1 is an example of a copying machine management system which includes a multi-function copying machine 601. The copying machine 601 is an image forming device connected to copying machines 602-605 with the same function via a LAN 600, and is connected to a management device 630 outside of the LAN 600 via the internet 620. Each copying machine 601-605, at a designated timing (when the operating voltage is switched on and when the print out quantity value exceeds the set value or when printing operation is completed), sends status data showing the current status to the management device 630.

The management device 630 has a database that stores status data, as well as a program that executes a feature extraction method; an abnormal occurrence prediction determination system (FIG. 15 PAD) comprised of a first stage determination unit and a second stage determination unit; and executes abnormal occurrence prediction determination of each copying machine subject to management. The abnormal occurrence prediction determination PAD (FIG. 15) program (feature extraction method of target data creation unit and the abnormal occurrence prediction determination component comprised of the first stage determination unit and the second stage determination unit) and the prediction determination reference data table (FIG. 19) comprised of the reference data cluster used by the abnormal occurrence prediction determination component are located in management device 630. Determination results showing a positive for abnormal occurrence prediction are displayed upon a display 640 of the management device 630 along with identification information (ID) of the corresponding copying machine 601-605. The operator of the management device 630 notifies the service center responsible for the area in which the copying machine 601-605 shown with a positive for abnormal occurrence prediction is located and if necessary order parts. If the predicted abnormal occurrence is something that the user can respond to, the administrator of the copying machine is notified. Users can respond to the problem by consulting the copying machine operations manual or the electronic manual built into an operations board 500.

The management device 630 is connected to a computer PCa controlled by an operator. The operator uses the computer PCa to, based upon the status data of each copying machine 601-605 in the database of the management device 630, create anew or adjust the abnormal occurrence prediction determination component (FIG. 18) and the abnormal occurrence reference data table (FIG. 19), add new abnormal occurrence prediction determination components and prediction determination reference data tables to the management device 630, delete existing abnormal occurrence prediction determination components and prediction determination reference data tables from management device 630, and such, to update the abnormal occurrence determination system (FIG. 15 PAD) of management device 630.

Figure 2:
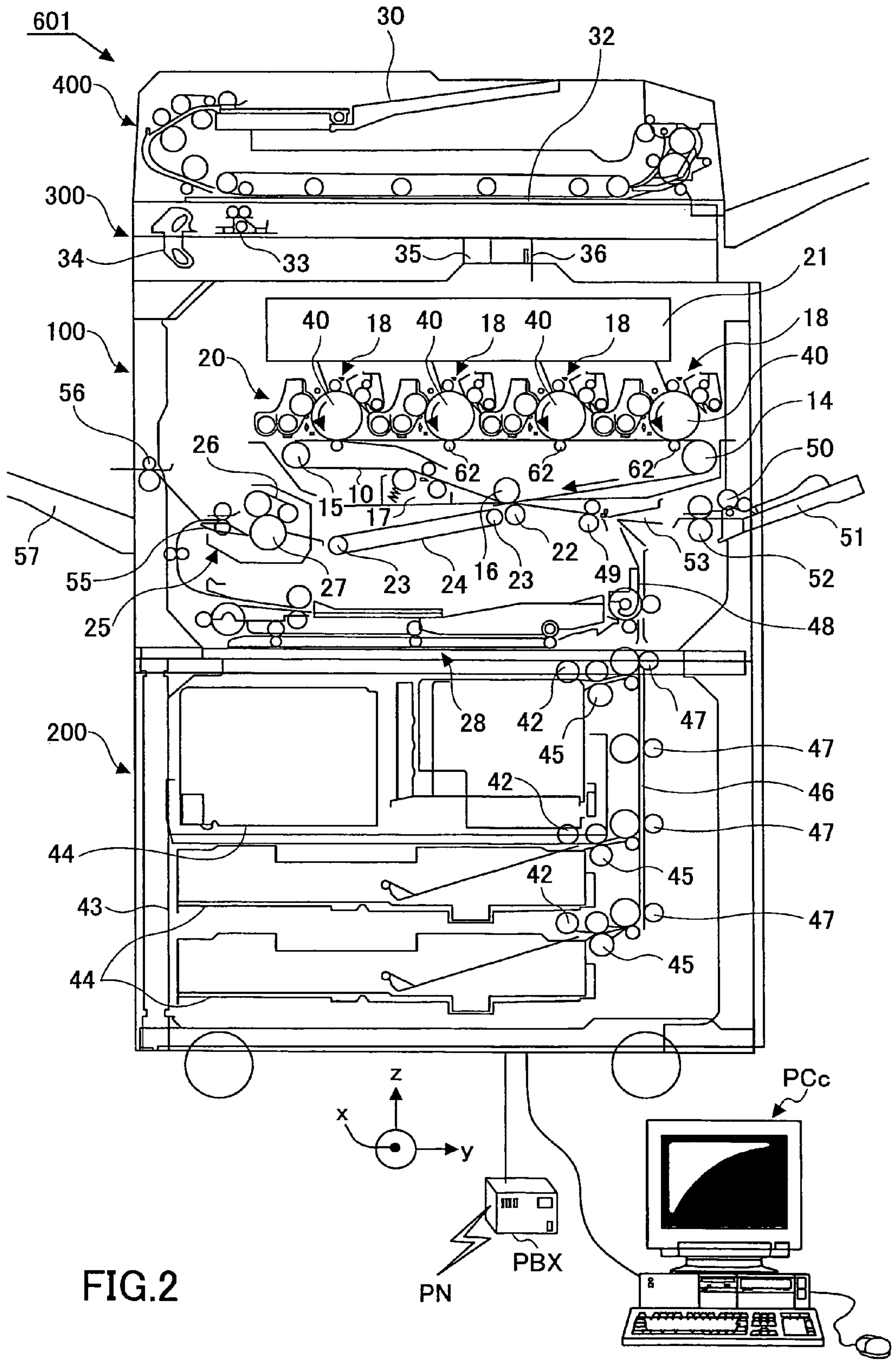
FIG. 2 is a cut-open side view of the color copying machine 601 with multiple functions illustrated in FIG. 1.
Figure 3:
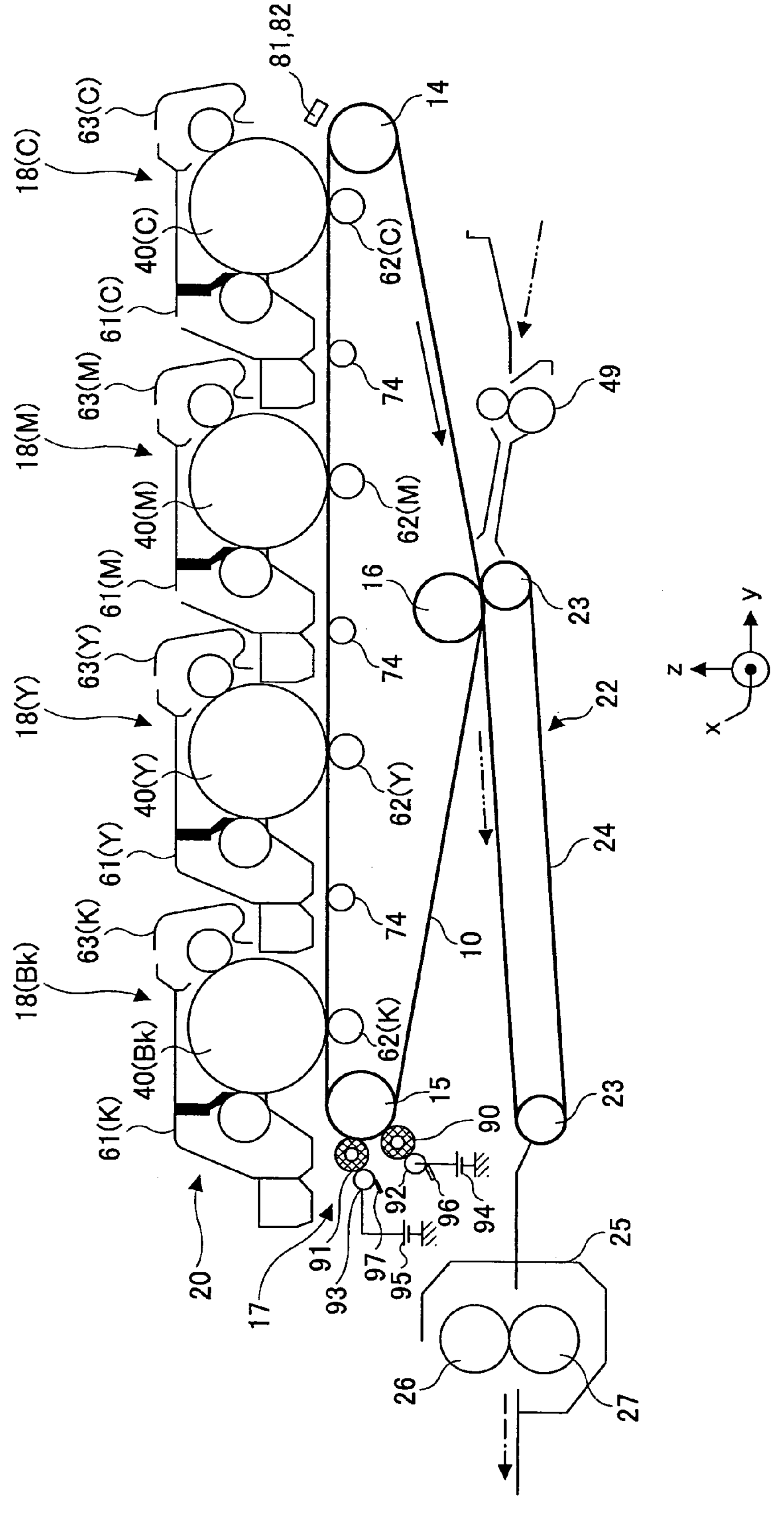
FIG. 3 is an enlargement of the intermediate transfer belt 10 and surrounding components illustrated in FIG. 2.
Figure 4:
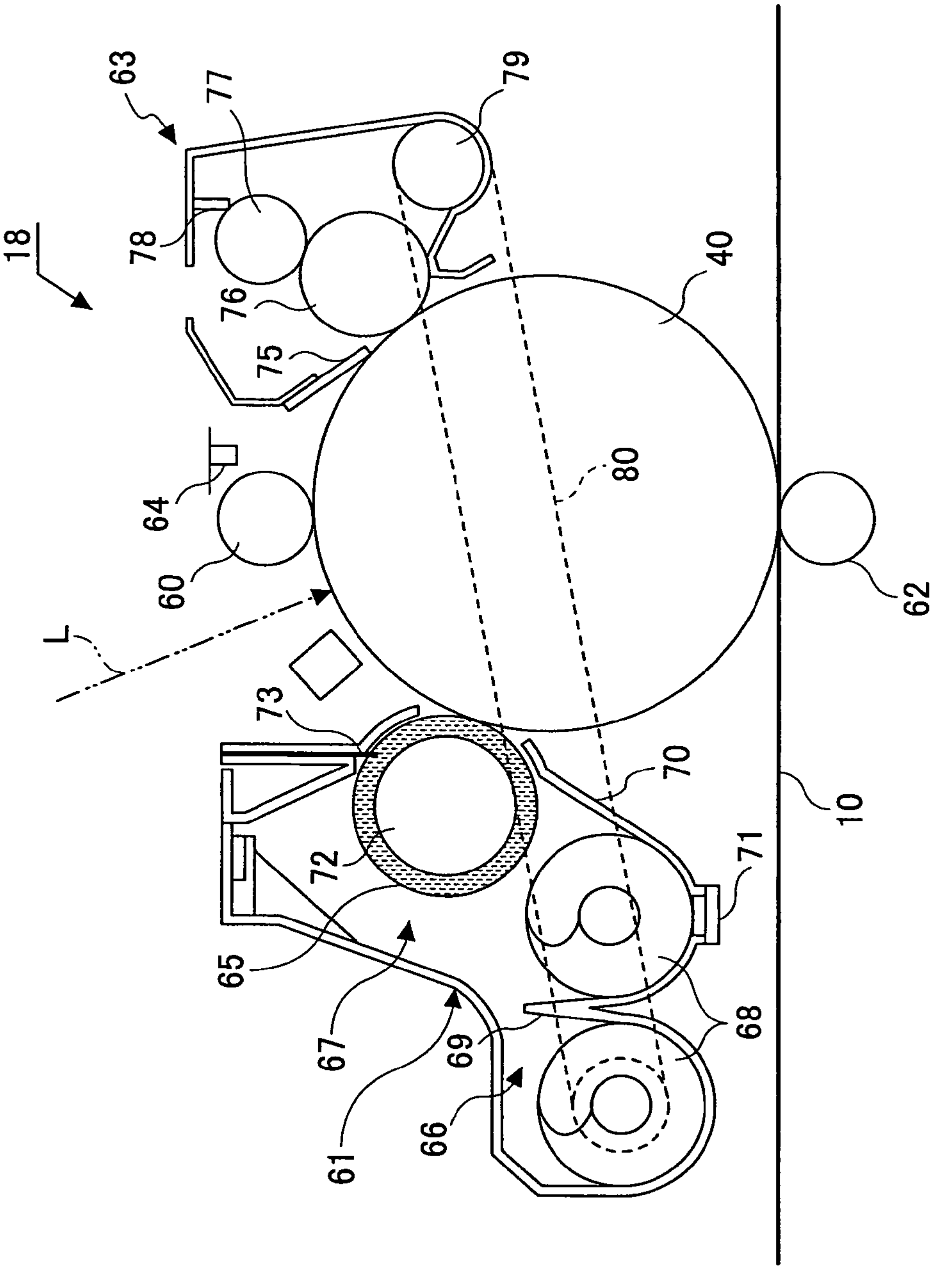
FIG. 4 is an enlargement of the structure common to the four image creation units 18 illustrated in FIG. 3.

Shown in FIG. 2 is a structural overview of the copying machine 601. The copying machine 601 has a printer 100 and a paper feeder section 200 comprising the image forming part, a scanner 300, and an ADF (automatic document feeder) 400. The scanner 300 is attached above the printer 100 and the ADF 400 is attached above the scanner 300. The scanner 300 reads image information of the document placed upon a contact glass 32 with a reading sensor (a CCD is used for this example) 36 and sends read image information to an engine control 510 (FIG. 8) of an IPP (Image Processing Processor; hereinafter referred to as IPP). The engine control 510, based upon the image information received from the scanner 300, controls a laser, LED, or such not shown in figure, set within an exposure apparatus 21 of the printer 100 and irradiates four drum-shaped photoreceptors 40 (K, Y, M, C: FIG. 3) with laser writing light L (FIG. 4). Due to this irradiation, an electrostatic latent image is formed upon the surface of the photoreceptors 40 (K, Y, M, C) and this latent image is developed into a toner image via a designated developing process. Note that the labels K, Y, M, C attached behind the numbers represent black, yellow, magenta, and cyan.

The printer 100 has not only an exposure part which is the exposure apparatus 21 but a transfer part which is first stage transfer rollers 62 (K, Y, M, C) and a second stage transfer apparatus 22, a fixation apparatus 25, a paper ejection apparatus, and though not shown in figures, a toner feeding apparatus, a toner disposal apparatus and such. The paper feeder 200 has an automatic paper feeder section attached below the printer 100 and a manual feeding section attached to the side of the printer 100. The automatic paper feeder section has, within a paper bank 43, three paper feeder cassettes 44 built in a multilevel layout, a feeder roller 42 that feeds the recording medium or transfer paper from the paper feeder cassette 44, and a separation roller 45, and such, which separates the fed transfer paper and sends it to a paper feeding route 46. Also the automatic paper feeder section has a conveyance roller 47, and such, which transports transfer paper to a paper feeding route 48 of the printer 100. Whereas, the manual feeding section has a manual feeding tray 51, a separation roller 52, and such, which feed transfer paper on the manual feeding tray 51 page by page to a manual paper feeding route 53.

Located around the end of the paper feeding route 48 of the printer 100 is a paper-stop roller pair 49. After the transfer paper is received from the paper feeder cassette 44 or the manual feeding tray 51, a paper-stop roller pair 49 sends the transfer paper at a designated timing to the second stage transfer nip formed between the intermediate transfer body which is the intermediate transfer belt 10 and second stage transfer apparatus 22.

When making a copy of a color image with this copying machine 601, the document is set upon the document plate 30 of the ADF 400, or the ADF 400 is opened and after setting document upon the contact glass 32 of the scanner 300, the ADF 400 is closed to hold down the document. Then a start switch not shown in figure is pushed. When the document is set in the ADF 400, the scanner 300 is activated after the document is transferred to the contact glass 32. When the document is set upon the contact glass 32 the scanner 300 activates immediately. Then a first carriage 33 and a second carriage 34 run wherein the light from light source of the first carriage 33 is reflected by the document surface and is routed to the second carriage 34. The mirror of the second carriage 34 reflects the light and the light is passed through an imaging lens 35 to reach a reading sensor 36 and is read as image information.

When the image information is read, the printer 100, with a drive motor not shown in the figures, drives in a rotational motion one of the support rollers 14, 15, and 16 and the other two follow in rotational motion. Thus, the intermediate transfer body or intermediate transfer belt 10, stretched upon these rollers, is moved in a treadmill (endless) motion. The laser writing and a development process described later is executed. Next, the formation of single color images of black, yellow, magenta, and cyan is executed with the rotation of photoreceptor 40 (K, Y, M, C). At the first stage transfer nips of K, Y, M, C where photoreceptors 40 (K, Y, M, C) and the intermediate transfer belt 10 make contact, the four color images are superposed one onto another via electrostatic transfer thereby forming the toner image. The single color toner images are formed upon the corresponding photoreceptors 40 (K, Y, M, and C).

To feed the transfer paper that corresponds to the size of the image information paper feeder section 200, conveyance rollers 47 feed and convey the transfer paper to the paper feeding route 48 of the printer 100. The transfer paper, which is the paper that entered the paper feeding route 48 after being sandwiched by the paper-stop roller pair 49 and stopped, has its timing adjusted and is sent to the contact section of the intermediate transfer belt 10 and one of second stage transfer rollers 23 of a second stage transfer apparatus 22 (see FIG. 3) which is the second stage transfer nip. The toner image of superposed four colors on the intermediate transfer belt 10 is synchronized and pressed upon the transfer paper at the second stage transfer nip. By the influence of an electric field for transfer formed at the nip and nip pressure, the toner image of superposed 4 colors is transferred to the transfer paper and combined with the white color of the paper to become a full color image.

The transfer paper that has passed through the second stage transcriptional nip is sent to a fixation apparatus 25 via the treadmill rotation of a conveyance belt 24 of the second stage transcription apparatus 22. After the full color image is fixed by the applied pressure of a pressure roller 27 of the fixation apparatus 25 and heating by a heating belt, the transfer paper is ejected via ejection rollers 56 to a paper receiving tray 57 on the side of the printer 100.

FIG. 3 shows the area around the transfer belt 10 of the printer 100 enlarged. The printer 100 has a belt unit, four process units 18 (k, Y, M, C) which form the toner images of corresponding colors, a second stage transfer apparatus 22, a belt cleaning apparatus 17, and a fixation apparatus 25 and such. The belt unit has an intermediate transfer belt 10 which is stretched over multiple rollers and moves in a treadmill motion while contacting the photoreceptors 40 (K, Y, M, and C). At the first stage transfer nip for K, Y, M, C where the photoreceptors 40 (K, Y, M, C) and intermediate transfer belt 10 come in contact, the first stage transfer rollers 62 (K, Y, M, C) apply pressure from the backside of the intermediate transfer belt 10 toward the photoreceptors 40 (K, Y, M, C), respectively. The first stage transfer rollers 62 (K, Y, M, C), by corresponding power units not shown in the figures, apply a first stage transfer bias. Thus at the first stage transfer nips of K, Y, M, C, are formed first stage transfer electric fields for electrostatic transfer of the toner images on the photoreceptors 40 (K, Y, M, C), respectively to the intermediate transfer belt 10. In between adjacent first stage transfer rollers 62 (K, Y, M, C), there are conductive rollers 74 that contact the backside of intermediate transfer belt 10. The conductive rollers 74 prevent the first stage transfer bias charges applied by the first stage transfer rollers 62 (K, Y, M, C) from flowing into the adjacent process unit (bias charge area) via a mid-resistance base layer 11 on the backside of the intermediate transfer belt 10.

Each of the process units 18 (K, Y, M, C) is a unit formed of the photoreceptor 40 (K, Y, M, C) and a number of other apparatuses supported by a common supportive frame and can be removed from the printer 100. The process unit 18(K) for the color black, for example, is comprised of not only the photoreceptor 40(K) but also a developing unit 61(K) which develops the electrostatic latent image formed upon the surface of the photoreceptor 40(K) into a black toner image, a photoreceptor cleaning apparatus 63(K) to clean residual transcription toner on the surface of the photoreceptor 40(K) after passing the first stage transfer nip, an electrostatic eliminating apparatus, not shown in the figures, to neutralize the surface of the photoreceptor 40(K) after cleaning, and an electrical charging apparatus, not shown in the figures, to uniformly charge the surface of the photoreceptor 40(K) after neutralization. The process units 18 (Y, M, C) of the other colors, other than handling different color toners, are of the same structure. The copying machine 601 has the four process units 18 (K, Y, M, C) arranged along the direction of movement of the intermediate transfer belt 10 in a so-called tandem structure.

Shown in FIG. 4 is the common unit structure of the four process units 18 (K, Y, M, C) enlarged. The four process units 18 (K, Y, M, C) each have the structure shown in FIG. 4. As the figure shows, process unit 18 has, around the photoreceptor 40, an electrical charging apparatus 60 for electrical charging, a developing apparatus 61 for developing, a first stage transfer roller 62 as the first stage transfer part, a photoreceptor cleaning apparatus 63, an electrostatic eliminating apparatus 64, and such. The photoreceptor 40 has a drum-like shape comprised of an aluminum tube and such, with a light-sensitive organic material spread and formed as a photosensitive layer on it. However an endless belt shaped type may be used as well. The electrical charging apparatus 60 is an electrical charging roller 60 that applies an electrical bias that rotates and contacts the photoreceptor 40. However a scorotron charger that performs non-contacting electrical charging of photoreceptor 40, or such may be used.

The development apparatus 61 develops latent images by using a developer of two components, a magnetic carrier and a non-magnetic toner. The development apparatus has a mixing section 66 that, while mixing, feeds the internalized two component developer to a developing sleeve 65 and a developing section 67 that transfers only the toner of the two component developer adhering to the developing sleeve 65 to the photoreceptor 40.

The mixing section 66 is located, at a lower position than the developing section 67 and has two screws 68 aligned parallel, with a partition 69 between these screws 68, and a toner concentration sensor 71 set at the bottom of developing case 70.

The developing section 67 has the developing sleeve 65 facing the photoreceptor 40 through the opening of a developing case 70 and within this a magnet roller 72 set to not rotate, and a doctor blade 73 with the point close to the developing sleeve 65. The distance between the doctor blade 73 and the developing sleeve 65, is approximately 500 μm. The developing sleeve 65 has a rotatable tubular form that is non-magnetic. To prevent the magnet roller 72 from rotating with developing sleeve 65, for example, five magnetic poles, N1, S1, N2, S2, and S3 from the doctor blade 73 are placed in the direction of rotation of the developing sleeve 65. These magnetic poles affect magnetic force against the two component developer on each sleeve at a designated position of the rotating direction, thus attracting and supporting the two component developer at the surface of the developing sleeve 65 and from mixing section 66 as well to form a magnetic brush along the magnetic lines on the sleeve 65 surface.

The magnetic brush accompanies the rotation of the developing sleeve 65 and is regulated to an appropriate layer thickness by passing the doctor blade 73 and is conveyed to a position facing the development area of the facing photoreceptor 40. The brush supports development by being transferred above the electrostatic latent image by the electric potential difference between the electrostatic latent image of the photoreceptor 40 and the developing bias applied to the developing sleeve 65. The brush then returns to within the developing section 67 accompanying the rotation of the developing sleeve 65 and after separating from the sleeve 65 surface by the effect of magnetic field repulsion between magnetic poles of the magnet roller 72 returns to the mixing section 66. Within the mixing section 66, based upon the detection results of the toner concentration sensor 71, an appropriate quantity of toner is supplied to the two component developer. Note that for the developing apparatus 61, in place of the two component developer a one component developer with no magnetic carrier may be used.

The photoreceptor cleaning apparatus 63 employs a method of pressing a polyurethane rubber cleaning blade 75 to the photoreceptor 40, though other methods can be used. To enhance cleaning, according to this example, a contact conductive fur brush 76 that contacts the outer surface of photoreceptor 40 employs a cleaning apparatus 63 that rotates freely according to the direction of the arrow shown in FIG. 4. By employing a metallic electric field roller 77 that applies a bias to the fur brush 76 and which rotates freely according to the direction of the arrow shown in FIG. 4, the point of a scraper 78 is pressed against the electric field roller 77. Toner removed from the electric field roller 77 by the scraper 78 is dropped onto retrieval screw 79.

The photoreceptor cleaning apparatus 63 in this structure removes residual toner on the photoreceptor 40 by rotating the fur brush 76 in a clockwise direction facing the photoreceptor 40. Bonded toner on the fur brush 76 is removed by the electric field roller 77 applied with a bias by contacting with the fur brush 76 rotating in a clockwise direction. Bonded toner on the electric field roller 77 is cleaned by the scraper 78. Toner retrieved by the photoreceptor cleaning apparatus 63 is gathered to one side of photoreceptor cleaning apparatus 63 by a retrieval screw 79, and is returned to the developing apparatus 61 by a toner recycle apparatus 80 and reused. The electrostatic eliminating apparatus 64 is comprised of an electrostatic eliminating lamp, and such, and removes surface electric potential of the photoreceptor 40 by irradiating light. After the surface of the photoreceptor 40 is neutralized, the electrical charging apparatus 60 electrically charges the surface uniformly and the light writing process is executed.

Shown in FIG. 3, below the belt unit in the figure, there is a second stage transfer apparatus 22. The second stage transfer apparatus 22 has a second stage transfer belt 24 stretched upon two rollers 23, which runs in a treadmill motion. Of the two rollers 23, one is a second stage transfer roller that has applied a second stage transfer bias by a power unit not shown in the figures. Sandwiched between intermediate transfer belt 10 at the roller unit 16 and the closer roller 23 is a second stage transfer belt 24. Thus the second stage transfer nip forms a contact point in which both belts move in the same direction. A full color image is formed upon the transfer paper sent to the second stage transfer nip from the paper stop roller pair 49, by the toner image of superposed four colors on the intermediate transfer belt 10 being transferred in one piece via the effect of the second stage transfer electric field and nip pressure of the second stage transfer apparatus 22. The transfer paper that has passed the second stage transfer nip separates from the intermediate transfer belt 10 and is sent, supported on the surface of the second stage transfer belt 24, by the treadmill motion of the belt 24, to a fixation apparatus 25. Note that in place of the second stage transfer roller a transfer charger or such may be used for second stage transfer.

The surface of the intermediate transfer belt 10 that has passed the second stage transfer nip then nears the position of the support roller 15. In this position the surface (upper side of the loop) of the intermediate transfer belt 10 is sandwiched between and contacts a belt cleaning apparatus 17 and the backside contacts the support roller 15. After the belt cleaning apparatus 17 removes bonded residual transfer toner from the surface, the transfer belt 10 proceeds to first stage transfer nips of K, Y, M, C sequentially and the superposing of the four colors is executed.

A belt cleaning apparatus 17 has two fur brushes 90 and 91. By contacting the intermediate transfer belt 10 and rotating, with multiple raised fur pieces implanted counter to the movement direction of the intermediate transfer belt 10, mechanical removal of residual transfer toner on the belt 10 is achieved. Also, by applying a cleaning bias with a power unit not shown in the figures by electrostatic means, attraction and retrieval of residual transfer toner is achieved.

In contact with the fur brushes 90 and 91 there are metal rollers 92 and 93, respectively which rotate along with or in the opposite direction. Of the two metal rollers 92 and 93, the metal roller 92 is positioned on the upstream side of the rotating direction of intermediate transfer belt 10 and has applied a negative polarity voltage by a power unit 94. The metal roller 93 is located on the downstream side and has applied a positive polarity voltage by a power unit 95. The metal rollers 92 and 93 contact the tips of blades 96 and 97, respectively. According to this structure, intermediate transfer belt 10 rotates, in the direction of the arrow shown in FIG. 3, with a treadmill motion and the fur brush 90 on the upstream side cleans the surface of the intermediate transfer belt 10. Here, for example, if −700V is applied to the metal roller 92 and −400V is applied to the fur brush 90, the positive polarity toner on the intermediate transfer belt 10 electrostatically transfers to the side of the fur brush 90. Then transferred toner on the fur brush 90 transfers to the metal roller 92 from the fur brush 90 due to an electric potential difference and is scraped off by the blade 96.

The fur brush 90, in this way, removes toner on the intermediate transfer belt 10 although there are still lots of toner particles left. The leftover toner is given a negative polarity due to the negative polarity bias applied to the fur brush 90. This is thought to be due to charge injection or discharge. By cleaning with the fur brush 91 on the downstream side, this time with a positive polarity bias applied, the leftover toner is removed. Removed toner is transferred from the fur brush 91 to the metal roller 93 by an electric potential difference and is scraped off by the blade 97. Toner scraped off by the blades 96 and 97 is retrieved into a tank not shown in the figures.

After being cleaned by the fur brush 91, the surface of the intermediate transfer belt 10 is almost free of toner but a little bit of toner is left. Toner left on intermediate transfer belt 10 is, as mentioned above, given a positive polarity due to the positive polarity bias applied to the fur brush 91. Then the toner is transferred to photoreceptors 40 K, Y, M, C due to the transfer field applied at the first stage transfer position and is retrieved by the photoreceptor cleaning apparatuses 63.

The paper stop roller pair 49 is generally used grounded but a bias can be applied to remove paper fragments of the transfer papers that are sent to paper stop roller pair 49.

Below the second stage transfer apparatus 22 and the fixation apparatus 25 there is a transfer paper inversion apparatus 28 (refer to FIG. 2), as mentioned above, aligned in parallel to the tandem section 20. The route of the transfer paper that has completed image fixation on one side is switched by the switching claw to the transfer paper inversion apparatus's side and is inverted and is sent again to the transfer nip of the second stage transfer apparatus 22. After the second stage transfer and fixation process of the image is completed on the other side, the transfer paper is ejected onto the paper receiving tray 57.

Figure 5A:
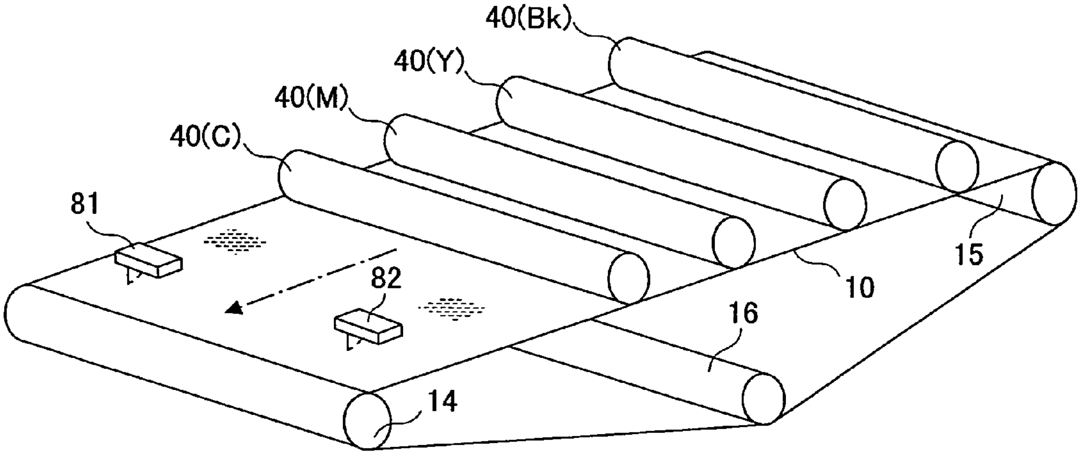
FIG. 5A is a diagonal perspective view of the light sensors 81 and 82 which detect toner concentration on the surface of the intermediate transfer belt 10 illustrated in FIG. 3.
Figure 5B:
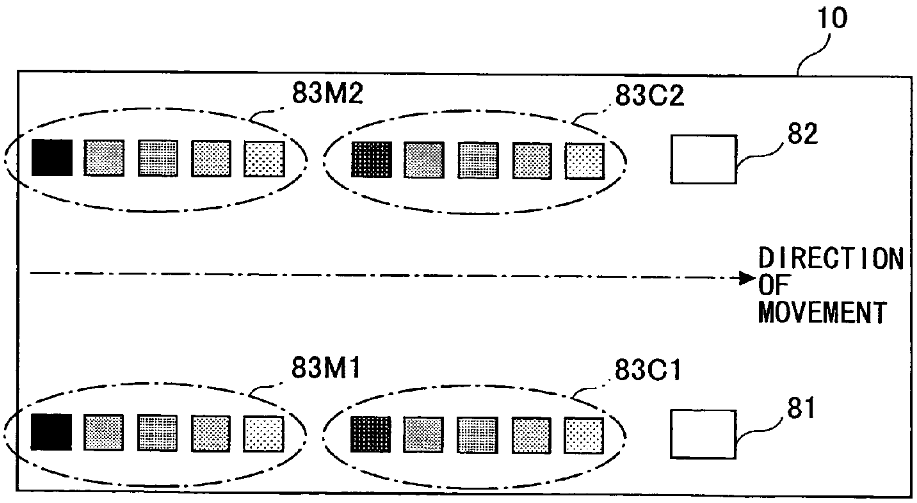
FIG. 5B is a top view of test patterns of the toner formed upon the intermediate transfer belt 10.

Facing the intermediate transfer belt 10 are light sensors 81 and 82 around the support roller 14. As shown in FIG. 5(*a*), the light sensors 81 and 82 face one toward each end (edge) of the belt 10. When conducting toner image concentration detection and toner image concentration adjustment, on both ends of the transfer belt 10 are formed concentration test marks (test patterns) of five grades sequentially for each color (C, M, Y, Bk), and the concentration (toner quantity) is detected by the light sensors 81 and 82. FIG. 5(*b*) shows, formed on the intermediate transfer belt 10, test patterns cyan (C) 83C1 and 83C2 and test patterns magenta (M) 83M1 and 83M2.

Figure 6A:
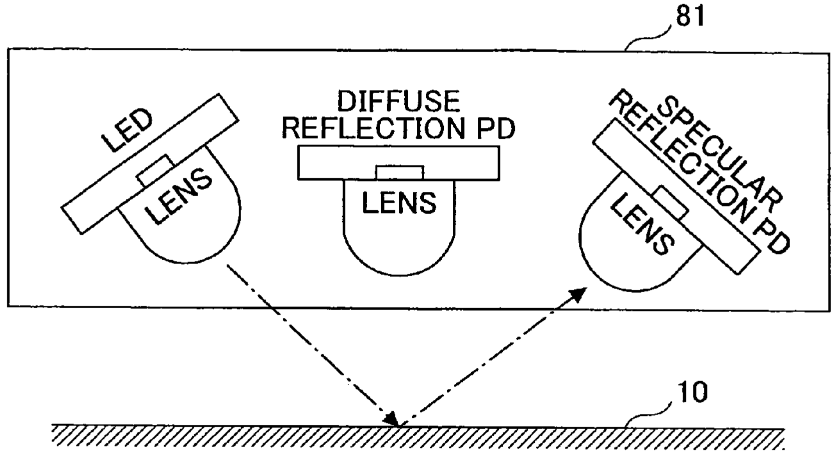
FIG. 6A is a schematic diagram of the structure of the light sensor 81 detecting contamination of the belt 10 surface.
Figure 6B:
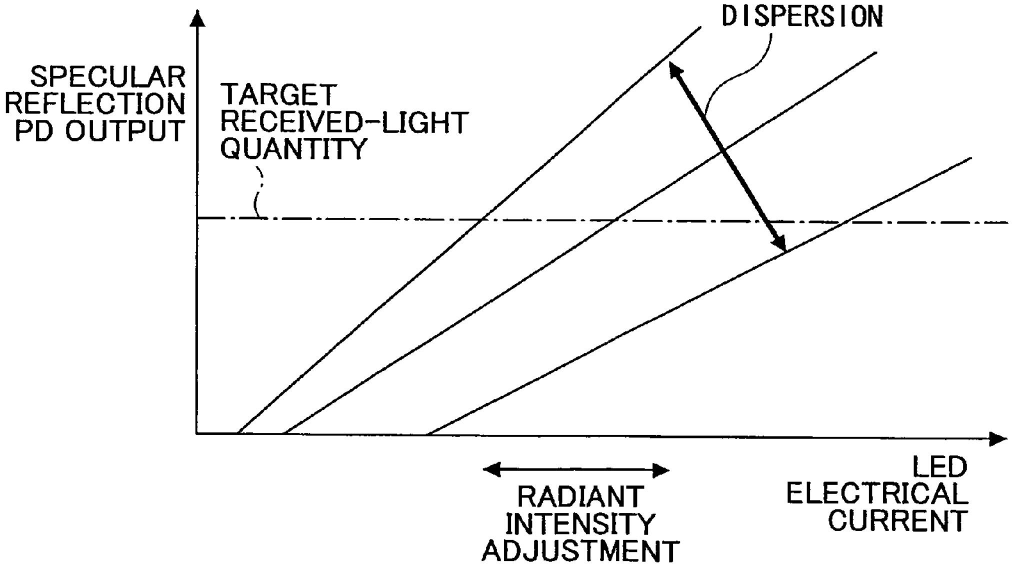
FIG. 6B is a graph illustrating the relationship of the detected levels of light signals and the electric current values of LED and specular reflection PD within the light sensor 81 which radiate light upon the intermediate transfer belt 10.

FIG. 6(*a*) shows the structure of the light sensor 81. The light sensor 81 is comprised of a LED (Light emission diode) that irradiates light at a diagonal angle to the belt 10, a specular reflection PD (photo diode) that catches specular reflection light from the belt 10, and a diffuse reflection PD that catches diffuse reflection light from the belt 10. The structure of the light sensor 82 is the same as the light sensor 81. To avoid the bonding of toner, material used for the intermediate transfer belt 10 generally has an extraordinary evenness. For example, belt materials with glossiness such as PVDF or polyimide and such are used.

In the toner image concentration adjustment, to set the reflected light quantity from the intermediate transfer belt 10 as a reference value, a radiant intensity adjustment (Adjustment value R) is made which adjusts the conducting current value of the LEDs of the light sensors 81 and 82, the development potential versus the toner image concentration characteristic line is adjusted to the reference characteristic line by a developing bias adjustment (Adjustment value Q), and exposure adjustment (Adjustment value P) is executed. Development potential is the difference between the photoreceptor surface electric potential and the development roller electric potential. Radiant intensity adjustment is the adjustment of the received-light quantity of light sensors 81 and 82 to a target received-light quantity shown in FIG. 6(*b*), by using the received-light signal of the specular reflection PD within the light sensor and adjusting the received-light quantity variation of the radiance-efficiency difference of individual LEDs, temperature variation, temporal variation, and the adjustment of received-light quantity variation of the light sensor due to surface contamination of the intermediate transfer belt 10.

Toner concentration adjustment is comprised of the development bias adjustment (Adjustment value Q) and the exposure adjustment (Adjustment value P). A five-grade concentration test pattern (toner image: for example, FIG. 5(*b*) 83C1 and such) for each color is formed upon the intermediate transfer belt 10 and concentration is detected by the light sensors 81 and 82.

Figure 7A:
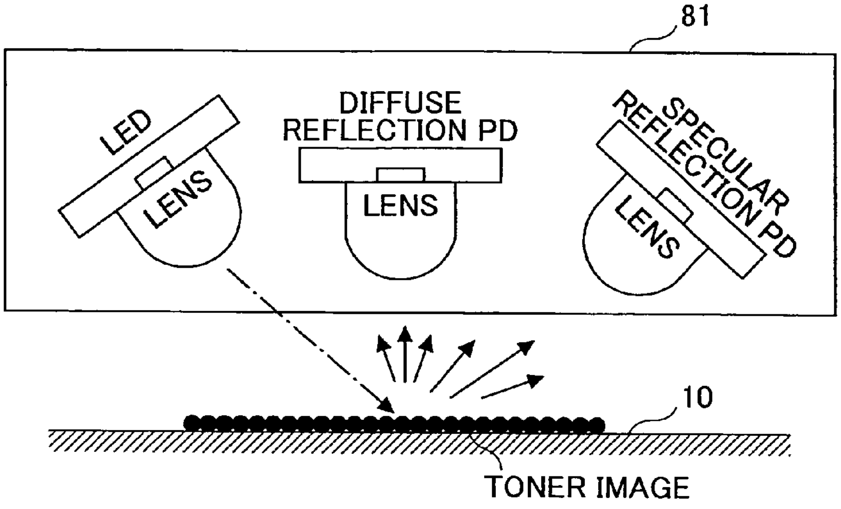
FIG. 7A is a schematic diagram of the structure of the light sensor 81 detecting toner image concentration of a test pattern on the belt 10.
Figure 7B:
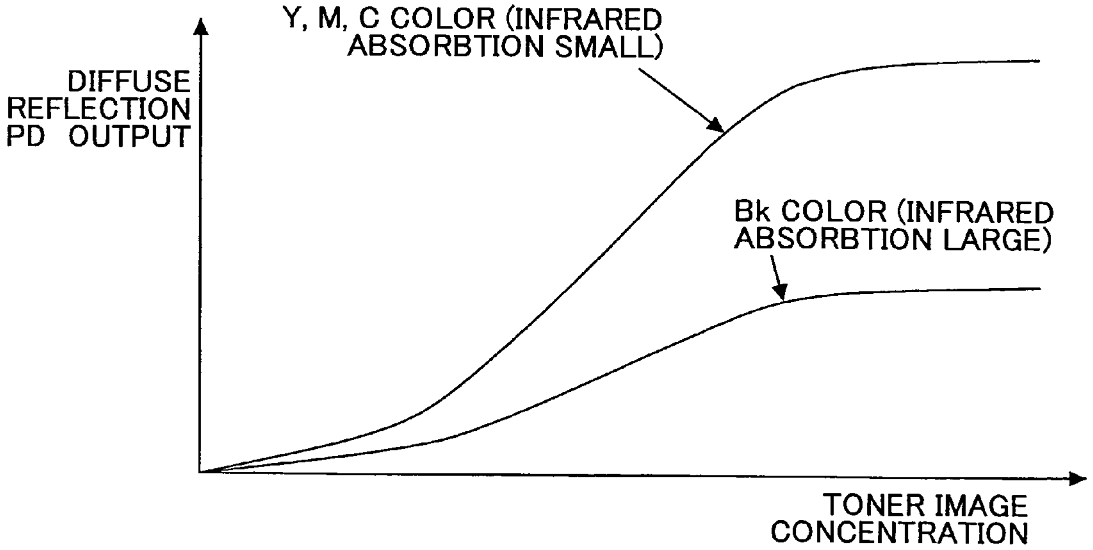
FIG. 7B is a graph illustrating the relationship of the detected level of light signals of diffuse reflection PD within light sensor 81 and toner image concentration.

Shown in FIG. 7(*a*) is a toner test pattern passing directly under the light sensor 81. When the test pattern of the toner comes to a facing position of the light sensor 81, the detection signal of the diffuse reflection PD which mainly receives diffuse reflection light from the toner is converted to diffuse reflection received-light data by A/D conversion of a CPU 517 (FIG. 8) and read, as shown in FIG. 7(*b*), based upon the toner concentration versus diffuse reflection PD output characteristic, and from the LUT (look up table) which converts reflection PD output to toner concentration, converts diffuse reflection received-light data to corresponding toner concentration data. More specifically, diffuse reflection received-light data are converted into toner concentration data.

A light source with a wavelength of around 840 nm of near-infrared or infrared is used for the LED light source of the light sensors 81 and 82 to minimize the influence of coloring agents which are contained in each color toner. Though as shown in FIG. 7(*b*), black color toner which generally uses low cost carbon black for toner coloring shows high light absorption even within the infrared domain and compared to the other colors has a low sensitivity to toner concentration.

Figure 8:
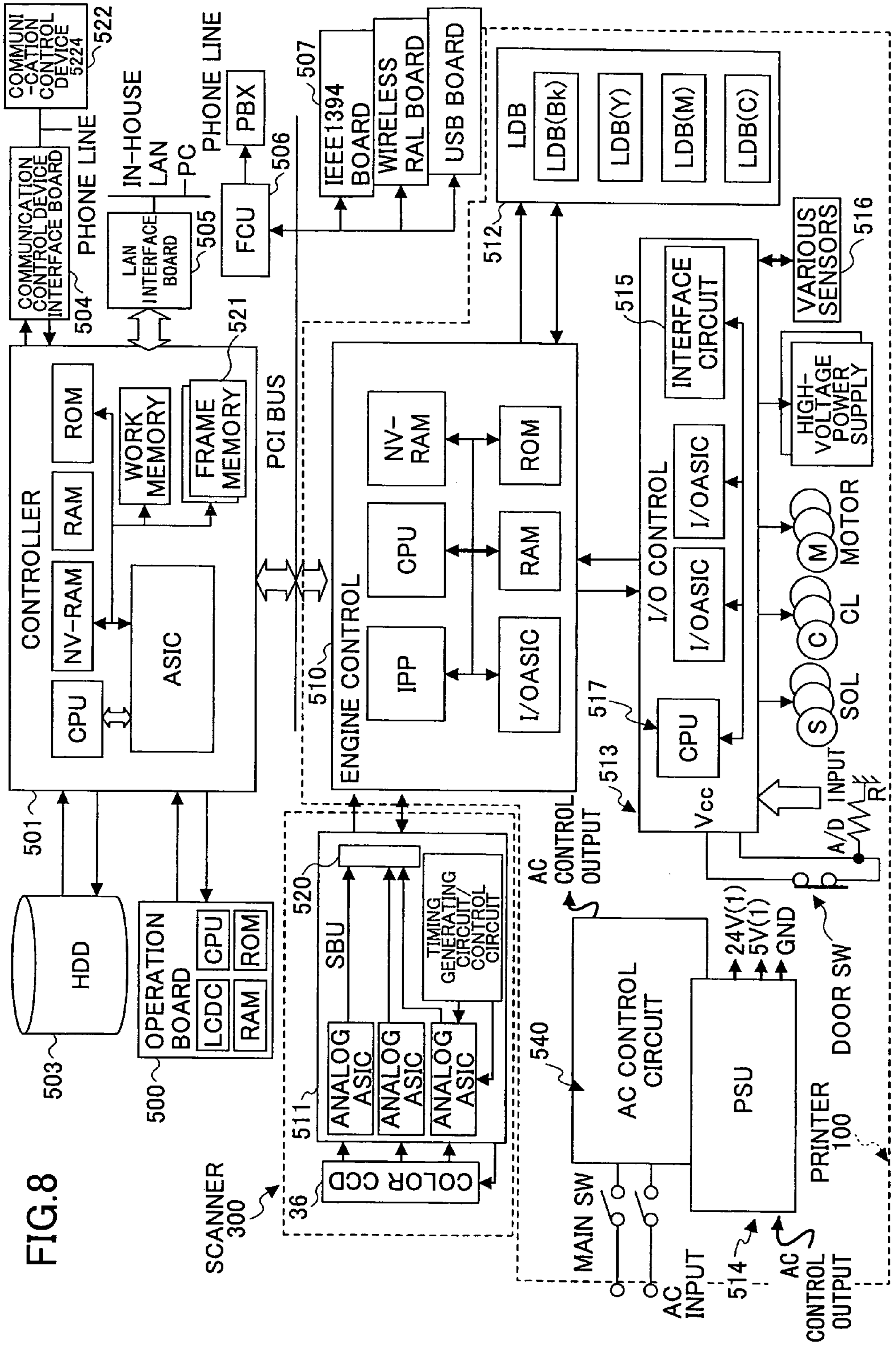
FIG. 8 is a block diagram of the image processing system of the copying machine 601 illustrated in FIG. 2.

FIG. 8 shows the system structure of the electrical system of the copying machine 601 shown in FIG. 2. The electrical system is comprised of a system controller 501 which controls the entire image forming apparatus, an operations board 500 of the image forming apparatus, a HDD 503 that stores image data, a communication control apparatus interface board 504 that connects to the outside using an analog line, a LAN interface board 505 connected to the controller 501, a FAX control unit 506, an IEEE 1394 board 507, a wireless LAN board, a USB board and such, connected to a universal PCI bus. An engine control 510 is connected to the controller 501 via the PCI bus. A I/O control board 513 controlling the I/O of the image forming apparatus, a scanner board (SBU: Sensor Board Unit) 511 that reads copy documents (images), a LDB (Laser Diode Board) 512 that irradiates image light (light writing) upon the photoreceptor drum that represents image data, connected to engine control 510, and such. Communication control apparatus interface board 504 immediately informs outside a remote diagnosis apparatus when a discrepancy occurs in the content of anomaly and status, and such, so that a serviceman can recognize and quickly repair the apparatus. It is also used for the transmission of the status of apparatus use.

Scanner 300, which optically reads the document, forms the document image on a CCD 36 via scanning the document illumination light source onto the document. The document image or the reflection light of light irradiated onto the document is converted by the CCD 36 with photoelectric conversion forming the R, G, B image signals. CCD 36 is a three line color CCD which creates the R, G, B image signals EVENch (even pixel channel)/ODDch (odd pixel channel), and inputs to the analog ASIC (Application Specific IC) of the SBU (Sensor board unit). SBU 511 is equipped with an analog ASIC, CCD, and a circuit that generates activation timing of the analog ASIC. The output of the CCD 36 is sample held by the sample hold circuit within the analog ASIC, converted to A/D, then converted to R, G, B image data. Then shading adjustment is conducted and is delivered at the output I/F (interface) 520 via the image data bus to an image data processing unit IPP.

IPP is the programmable computing process part for image processing, which conducts separate creation (assessment whether image is a text domain or photo domain: image zone separation), real-time threshold/surface removal, scanner-gamma conversion, filter, color correction, variable power, image fabrication, printer-gamma conversion, and gradation processes. Image data that are transferred from the SBU 511 to the IPP, due to signal degradation (signal degradation of scanner systems) that accompanies quantization of optical and digital signals, are adjusted at IPP and written in the frame memory 521.

System controller 501 is equipped with a ROM to store control programs of the CPU and system controller board, a RAM for task memory used by the CPU, an internalized lithium battery, an NV-RAM for the backup of the RAM and an internalized clock, a system bus control for the system controller board, a frame memory control, an ASIC for the control of peripherals around the CPU such as FIFO control and interface circuits for such.

System controller 501 controls the entire system and has functions of multiple applications such as a scanner application, a facsimile application, a printer application, and a copy application. Operations board 500 deciphers the input and displays the system setup and status on the display section of the operations board 500. Many units are connected to the PCI bus and image data and control commands are time-divisionally transferred with the image data bus/control command bus.

Communication control apparatus interface board 504 is a communication interface board for the communication control apparatus and the controller 501. Communications with the controller 501 are done by full duplex asynchronous serial communication. A communication control apparatus 522 is connected in a multi-drop connection in accordance with RS-485 interface standards. Communications with remote management apparatus 630 are conducted via a communication controller apparatus interface board 504.

A LAN interface board 505 is a communication interface board connected to the in-house LAN 600 (FIG. 1) which connects the controller 501 and the in-house LAN and is equipped with a PHY chip. The LAN interface board 505 is connected to the controller 501 via a standard communication interface PHY chip I/F and 12C bus I/F. Communications with external devices are executed via the LAN interface board 505.

The HDD 503 is an application database for housing system application programs and apparatus bias information of the printer and image formation process apparatus, and is used as an image database to store read-image or write-image data or in other words image data, and document data. Both physical and electronic interfaces comply with ATA/ATAP1-4 interface and are connected to the controller 501.

The operations board 500 is equipped with a CPU, a ROM, a RAM, a LCD, and an ASIC (LCDC) for the control of key inputs. Within the ROM is written the control program which reads inputs and controls display output of the operations board 500. The RAM is a task memory used by the CPU. Communications with the system controller 501 enable the user, via operation of the panel, to input system settings, to display setup contents and status to the user, and control the display and input.

The write-signal of each color, black (Bk), yellow (Y), cyan (C), magenta (M), outputted by the working memory of system controller 501 is inputted to the write-circuit of the Bk, Y, M, C, respectively of the LDs (Laser Diode) of the LDB (Laser Diode control Board). At the LD write-circuit LD current control (modulation control) is conducted and outputted by each LD.

An engine control 510 is a process controller that mainly controls image fabrication of image formation and is equipped with a CPU, an IPP that conducts image processing, a ROM with a built-in program to control copying and printout, a RAM to control the ROM, and a NV-RAM. The NV-RAM is equipped with a SRAM and memory which stores in EEPROM by detecting power off. Also, the I/O ASIC with a serial interface which conducts send-receive of signals with the CPU to control other components is an ASIC which controls nearby I/O (counter, fan, solenoid, motor, and such) implemented with an engine control board. The I/O control board 513 and the engine control board 510 are connected with a synchronous serial interface.

The I/O control board 513 is equipped with a sub CPU 517, which reads the detection signal of the temperature sensor, the electric potential sensor, the concentration sensor on the photoreceptor (P sensor) which is the toner quantity sensor and light sensors 81 and 82 which are the toner concentration sensors, and other various sensors, and conducts analog control, paper jamming detection which consults the detection signal of the paper sensor, and I/O control of the image forming apparatus including the paper conveyance control. An interface circuit 515 is the interface circuit with the various sensors and actuators (motor, clutch, and solenoid). The light sensors 81 and 82 are included in the various sensors 516.

A power apparatus PSU 514 is a unit which supplies power to control the image forming apparatus. Main power is supplied when the main SW is on (closed). From the main power is supplied the main AC to the AC control circuit 540, and by using AC control output rectified and leveled by the AC control circuit 540, the power apparatus PSU 514 supplies DC voltage necessary to each control board. The CPU of each control section operates with the constant voltage created by the power apparatus PSU.

The copying machine 601 is equipped with a data acquisition part to acquire various information items related to the status and phenomenon occurring within the structure components. The data acquisition part is comprised of, as shown in FIG. 8, the engine control 510, the I/O control 513, various sensors 516, and the operations board 500. The engine control 510 is the control part, which govern the entire hardware of the copying machine 601 and is equipped with a ROM that stores the control programs, a RAM that stores the computing data, control parameters, and such, and a CPU and such which are the computing part.

In the copying machine 601, the data acquisition part comprised of the engine control 510, the I/O control 513, various sensors 516, the operations board 500, and such, at a specific timing detect the various statuses and creates status evaluation data based upon the detection data, and the engine control 510 adjusts each operations control parameter of the copying machine 601, and identifies or detects failure. The detection data, evaluation data, and control parameter values are stored in the NV-RAM of the engine control 510 as status data. Status data, herein set forth are any of the following: control parameter values that effect image creation characteristics, detection data of the status sensor, and evaluation data created from detection data. More specifically, status data include detection data, evaluation data, and control parameter values.

—Acquired Data—

Various data elements acquired by the data acquisition part of the copying machine 601 are the above-mentioned status data, input data, image-read data, and such. Details are as follows.

(a) Detection Data

Detection data are drive status, various characteristics of storage media, developer characteristics, and photoreceptor characteristics, status of various processes of electro-photography, environmental factors, and status values detected to identify various characteristics of the recording medium.

An overview of detection data is as follows.

(a-1) Drive-Train Data

Drive-train data are detected photoreceptor drum rotational velocity by the encoder, read drive motor current value, and read drive motor temperature.

Drive-train data are detected drive status of cylindrical or belt shaped parts such as the fixation roller, paper conveyance roller, drive roller, and such.

Drive-train data are detected sound generated by the drive train with a microphone set within or without the apparatus.

(a-2) Paper Conveyance Status

Paper conveyance status data are data of the front and end positions of the conveyed paper read with a transparent or reflective type light sensor or a contact type sensor, the detection of paper jamming, the mistiming of passage of the front and end of the paper, and the read change to the perpendicular direction and the feeding direction of the paper.

Paper conveyance status data are data of the travelling speed of paper measured by the difference between the detection timing of the multiple sensors.

Paper conveyance status data are measured data of the slip between the feeding roller and paper at the timing of paper feeding by comparison of the roller rotational velocity value and the travel distance of the paper.

(a-3) Various Characteristics of Recording Media such as Paper

These data highly influence image quality and the stability of sheet conveyance. Examples of acquisition methods of paper type data are as follows.

The acquisition of paper thickness is done by sandwiching the paper between two rollers and with optical sensors, or such, detecting the relative position displacement of the rollers, or by detecting the amount of movement of the component that is pushed up by the entry of paper which is equivalent to the displacement amount.

Paper surface roughness is acquired by the guide, and such, contacting to the paper surface before transfer and detecting the vibration or sliding sound by the contact.

Paper glossiness is acquired by focusing a beam at a specified angle of aperture to a specified angle of incidence and with a sensor measuring the beam of the specified angle of aperture that reflects in the mirror surface reflection direction.

Paper rigidness is acquired by measuring the deformation (bending amount) of paper under a pressing force.

Whether the paper is recycled paper is determined by detecting penetration efficiency of ultraviolet light irradiated upon the paper.

Whether the paper is backing paper is determined by irradiating light from a linear light source such as a LED array and with a solid-state image sensing device such as a CCD detecting the reflected light from the transfer face.

Whether the sheet is for OHP use is determined by irradiating light upon the paper and detecting the specular reflection with a different angle to the transmitted light.

Water content contained in the paper is acquired by measuring absorption of infrared or μ-wave light.

Curl amount is acquired by a light sensor, contact sensor, or such.

The electrical resistance of paper is acquired by direct measurement of a pair of electrodes (such as the feeding roller) contacting the recording paper or by measuring surface electric potential of the photoreceptor or intermediate transfer body after paper transfer and from that value estimate the resistance value of the recording paper.

(a-4) Developer Characteristics

The developer (toner and carrier) characteristic within the apparatus influences the core of electro-photographic processes. Therefore is an important factor for system operation and output. The acquisition of developer information is of vital importance. The following items are examples of developer characteristics.

Developer characteristics for the toner are amount of static build-up and its distribution, fluidity, cohesion, bulk density, electrical resistance, amount of additive agents, amount of consumption or remaining amount, and toner concentration (mixture of toner and carrier).

Developer characteristics for the carrier are magnetic characteristics, the thickness of coating layer, and amount of consumption.

To detect these data elements from within the copying machine 601 individually is usually difficult. Therefore detection as a comprehensive characteristic of the developer is desirable. The comprehensive characteristics of the developer can be measured, for example, as follows.

By forming a latent image for testing upon the photoreceptor and develop under predetermined development conditions and measure the reflection concentration (photoreflectance) of the formed toner image.

By establishing a pair of electrodes within the developing apparatus and measuring the relationship of applied voltage and electric current (resistance, dielectric constant, and such).

By establishing a coil within the developing apparatus and measuring the voltage-current characteristics (inductance).

By establishing a level sensor within the developing apparatus and detecting the developer capacitance. There are optical types and electrostatic capacitance types for level sensors.

(a-5) Photoreceptor Characteristics

Like the developer characteristics, photoreceptor characteristics are closely related to the function of electro-photography. Data for photoreceptor characteristics are film thickness of the photoreceptor, surface characteristics (friction coefficient, concavo-convexity) surface potential (before and after each process), surface energy, diffuse light, temperature, color, surface position (deflection), linear speed, potential decay speed, electrical resistance, electrostatic capacitance, and surface water content. Among these, those that can be detected within the copying machine are as follows.

Film thickness can be measured by gauging the change to electrostatic capacitance which accompanies film thickness change by detecting the electric current which flows from the electrically charged component to the photoreceptor, and by simultaneously cross-checking the applied voltage of the electrically charged component with the voltage current characteristic set against the dielectric thickness of the photoreceptor.

Surface potential and temperature can be measured with conventionally known sensors.

Linear speed can be detected from an encoder attached to the rotation axis of the photoreceptor.

Diffuse light from the surface of the photoreceptor can be detected with the light sensor.

(a-6) Electro-Photographic Process Status

Toner image formation by the electro-photographic method is conducted in the order of uniform electrical charging of the photoreceptor, latent image formation (image exposure) by laser light and such, development by toner (coloring particles) with electrical charge, transfer (for color, superposition is executed onto the recording medium which is the intermediate transfer body or final transfer component, or is executed onto the photoreceptor at the time of development) of toner image to the transfer component, and fixation of the toner image to the recording medium. The various information items acquired at each stage highly influence the output of the image and other systems. Acquisition of such information is important for the evaluation of system stability. Examples of electro-photographic process status data and their acquisition are as follows.

Acquisition of the charged electric potential and potential of the exposure component can be done with the conventionally well known surface potential sensor.

Acquisition of the gap data between the non-contact potential of the electrically charged component and the photoreceptor can be acquired by measuring the amount of light that has passed through the gap.

Electromagnetic waves by electrical charge can be perceived with a wide-band antenna.

Sound generated by the electrical charge.

Exposure intensity.

Exposure light wavelength.

Also, methods to acquire the various statuses of the toner image are as follows.

Acquire pile height (height of toner image) by measuring the depth from the vertical direction with a displacement sensor and the shade length with a parallel light linear sensor measured from a horizontal direction.

Acquire electrically charged toner quantity by measuring the electric potential of the solid section of the electrostatic latent image and the electrical potential of the developed latent image with an electrical potential sensor, and compare this to the adherence quantity converted from the reflection concentration sensor of the same location.

Acquire dot fluctuation or dust by detecting the dot pattern image on the photoreceptor with the infrared light area sensor or detecting the wavelength corresponding to each color on the intermediate transfer body with the area sensor, and apply appropriate processing.

Acquire the amount of offset by reading the corresponding location upon the recording paper and fixation roller with the light sensor and comparing.

Acquire the remaining amount of transfer by installing a light sensor behind the transfer process (upon PD, upon belt) and from the amount of reflection light from the residual pattern after transfer identify.

Detect color unevenness at the time of superposition after fixation upon the recording paper with a full color sensor.

(a-7) Formed Toner Image Characteristics

Optically detect image concentration and color. Either reflection light or penetration light is okay. Choose thrown light wavelength according to color. Information of concentration or single color can be obtained from the photoreceptor or intermediate transfer body though to measure color combination such as color unevenness it is necessary for it to be upon paper.

To detect gradation, use a light sensor to detect the toner image formed on the photoreceptor for each gradation level or reflection concentration of the toner image transcribed to the transfer body.

To measure sharpness, use a single eye sensor with a small spot diameter or a high resolution line sensor to read the transfer image or developed line repetition pattern.

To measure granularity (roughness), with the same method as the detection of sharpness, read a half-tone image and calculate noise elements.

To measure resist/skew, establish a light sensor at both ends in the main scanning direction after resist and contrast the detected timing of the resist-roller-on timing and both sensors.

To detect color displacement, detect the edge section of the superposed image on the intermediate transfer body or recording paper with a single eye spot sensor or high resolution line sensor.

To measure banding (concentration unevenness in the feeding direction), measure the concentration unevenness of the recording paper in the sub-scanning direction with a small diameter spot sensor or high resolution line sensor and measure the amount of signal of the specific wavelength.

Degree of glossiness (unevenness) is detected by using a specular reflection type optical sensor on a recording paper with a formed uniform image.

To detect photographic fog upon the photoreceptor, intermediate transfer body, or recording paper with an optical sensor having a fairly wide reading range read the image background section or acquire image information of the whole background section with a high resolution area sensor and count the number of toner particles contained in the image.

(a-8) Physical Characteristics of the Print Material of the Image Forming Apparatus To identify image smearing or image fading detect the toner image upon the photoreceptor, intermediate transfer body, or recording paper with an area sensor and process the acquired image information.

Measure toner dust by reading the image on the recording paper with a high resolution line sensor or area sensor and calculate the amount of toner dispersed around the pattern section.

Posterior white omission and solid cross white omission, on the photoreceptor, intermediate transfer body, or recording paper is detected with a high resolution line sensor.

The detection of curl, undulation, and bend of the recording paper is done by the displacement sensor. Placing sensors near both ends of the recording paper is an effective way to detect bends.

Scratches and blemishes on the edge surface can be detected by establishing an area sensor vertical to the paper ejection tray and after a certain amount of paper is accumulated, analyze the edge surface.

(a-9) Environmental Status

To detect temperature the following can be employed. A thermoelectric couple method which extracts as a signal the thermo-electromotive force produced at the contact point of dissimilar metals or a metal and semiconductor, a resistance variation element which uses the change of resistance of metal or semiconductors by temperature, for certain types of crystals, a pyro-electric type element that with temperature rise produces surface electrical potential by charge polarization within the crystal, and a thermo-magnetic effect element which detects with the rise of temperature the change of magnetic characteristics.

To detect humidity, there are humidity sensors of an optical measurement method which measure the light absorption of $H_2O$ or OH radicals and humidity sensors which measure the change of the electrical resistance value of materials due to water vapor absorption of materials.

To detect various gases, the measurement of change to electrical resistance of the oxide semiconductor which accompanies gas absorption is typical.

To detect airflow (direction, current velocity, type of gas), there are methods of optical measurement though it is especially effective to use an air-bridge type flow sensor when considering installation into the system due to taking less space.

To detect barometric pressure or pressure, there are methods such as measuring the mechanical displacement of the membrane used in pressure-sensitive materials. The same method is used for the detection of vibration.

(b) Control Parameter

It is effective to directly use the input-output parameter of the control section due to the action of the copying machine being determined by the control section.

(b-1) Image Formation Parameter

The following are examples of outputted parameters from the computing process of the control section for image formation.

The setting values of process conditions by the control section, for example, charged electric potential, development bias value, and fixation temperature setting value.

The setting values for various image processing parameters for half-tone processing or color adjustment.

The setting of various parameters for apparatus operation by the control section such as the timing for paper conveyance and the execution time of the preparation mode before image formation.

(b-2) User Operation History

The frequency of various operations chosen by the user such as number of colors, number of pages, and image quality instruction.

The frequency of paper size chosen by the user.

(b-3) Electricity Consumption

Total electricity consumption of total term or a specified term unit (1 day, 1 week, or 1 month, etc.) or its distribution, amount of variation (derivative), and cumulative value (integral).

(b-4) Consumption Information of Consumable Supplies

The consumption of toner, photoreceptor, and paper of a total term or a specified term unit (1 day, 1 week, or 1 month) or its distribution, amount of variation (derivative), and cumulative value (integral).

(b-5) Abnormal Occurrence Information

The frequency of abnormal occurrence (by type) of a total term or a specified term unit (1 day, 1 week, or 1 month) or its distribution, amount of variation (derivative), and cumulative value (integral).

(b-6) Operation Time Information

Operation time is recorded with the temporal part of the copying machine.

(b-7) Print Operation Frequency

The count value is recorded as each page is printed out.

(C) Information of Inputted Image

The following information is acquired from image information received as direct data from the host computer or image information obtained from a document read by the document image scanner and image processed.

Acquisition of color pixel accumulation count is done by counting each pixel of each GRB signal of the image data.

According to the image area separation method of Japan Patent No. 2621879 the text, halftone dot, photo, and background of the original image can be divided and the rate of the text section and halftone section can be acquired. In the same way the rate of color text can be acquired.

The toner consumption distribution in the main scanning direction can be acquired by counting the color pixel accumulation value divided into each area in the main scanning direction.

The image size is acquired by the color pixel distribution of the image size signal or image data produced by the control section.

The type of text (size, font) is acquired from the text attribute data.

In the following are shown specific acquisition methods of various types of data referred to by the copying machine.

(1) Temperature Data

The copying machine is equipped with a resistance variation element that is used as a temperature sensor to acquire temperature information which is structurally simple with a simple principle and is ultra compact.

(2) Humidity Data

A humidity sensor which is compact is effective. The basic principle is that when water vapor is absorbed by the moisture sensitive ceramic, there is a decline in electrical resistance of the ceramic due to the increase of ionic conduction by absorbed water. Moisture sensitive ceramics used are porous materials usually of alumina, apatite, or Zr02-Mgo series.

(3) Vibration Sensor

Vibration sensors are basically the same as sensors which measure barometric pressure and pressure and when considering the implementation to the system, a sensor using silicon which can be ultra-miniaturized is especially effective. Data are measured by measuring volume change between the movement of the oscillator formed upon the diaphragm of thin silicon and an electrode fixed facing the oscillator. It also can be measured by using a piezo-resistance effect of the Si diaphragm.

(4) Toner Concentration (All 4 Colors) Data in Development

To acquire this data, use conventionally well known methods for toner concentration sensors and detect the toner concentration of each color and convert to data. For example, according to Japanese Laid-Open Patent Application No. H6-289717, toner concentration detection is done by a sensing system which measures the change of magnetic permeability of the developer in the developing apparatus.

(5) Uniform Electric Charge Potential Data (All 4 Colors) of the Photoreceptor

To acquire this data use well known surface potential sensors which detect the surface potential of objects and detect the uniform electric charge potential of the photoreceptor 40 (K, Y, M, C) of each color.

(6) Electric Potential Data (All 4 Colors) after Photoreceptor exposure

To acquire this data detect the surface potential of photoreceptor 40 (K, Y, M, C) after light writing in the same way as in (5) above.

(7) Coloring Area Rate Data (All 4 Colors)

Measure the coloring area rate of each color by the ratio of the accumulation value of pixels to be colored and the accumulation value of the entire pixels from the input image information.

(8) Development Toner Quantity Data (All 4 Colors)

Measure based upon the received light quantity signal from the reflective type photo-sensors 81 and 82 the concentration of the toner image of each color developed on the photoreceptor 40 (K, Y, M, C).

(9) Tilt of the Front End Position of the Paper

Detect both ends of the front of the conveyed transfer paper by establishing a light sensor pair somewhere on the feeding route from the paper feeding roller 42 of the paper feeding section 200 to the second stage transfer nip which is perpendicular to the conveying direction and detect both ends of the transfer paper.

(10) Paper Ejection Timing Data

Detect with a light sensor the passage of transfer paper between ejection roller pair (56 of FIG. 1) and measure with the transmission of the drive signal of the paper feeding roller as a reference.

(11) Total Electric Current Data of Photoreceptor (All 4 Colors)

Measure electric current by establishing a electric current measurement part between the photoreceptor plate and grounding terminal and detect electric current running from the photoreceptor 40 (K, Y, M, C) to ground.

(12) Photoreceptor Drive Power (All 4 Colors)

Measure the consumed drive power (electric current×voltage) by using an ammeter or voltmeter when the drive source (motor) of the photoreceptor is running.

—Acquisition Time of Various Data Elements—

The above-mentioned various data elements (1)~(12) are read by the I/O control 513 according to the instruction of the engine control 510 (CPU, hereinafter the same) at their respective timings. The engine control 510 takes read various data and adds the print number integrated value and stores the data in the designated status information database (DB) of the NV-RAM within the engine control 510, and based upon the various data identifies the status of each section of the copying machine 601 and adjusts the control parameter as is required and identifies failure. Status evaluation data created from the status determination, the adjusted value of the control parameter and, if failure has occurred, the content of the failure is stored in the status information database (DB).

Figure 9:
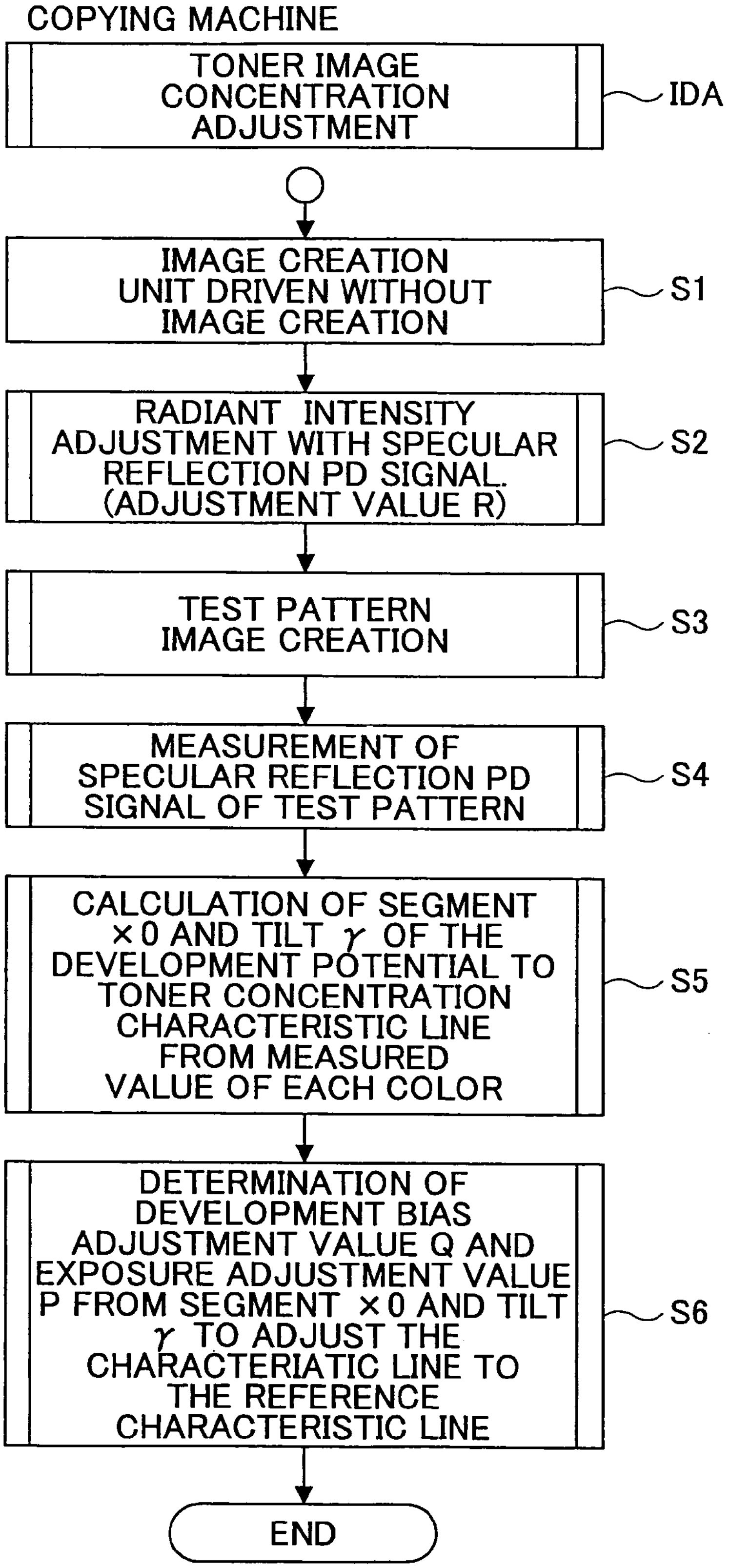
FIG. 9 is a flowchart of the toner image concentration adjustment by engine control 510 illustrated in FIG. 8.

Shown in FIG. 9 is the content of the "toner concentration adjustment" IDA set by control parameter values, radiant intensity adjustment value R, development bias adjustment value Q, and exposure adjustment value P. At "toner concentration adjustment" IDA, the engine control. 510 drives an image creation mechanism (51), converts received light signal of specular reflection PD of the light sensors 81 and 82 to a digital signal, and adjusts electric current value of the LED within the light sensor to designate this as a reference value (target received-light quantity of FIG. 6(*b*)) (S2). This enables the accurate measurement of the disparity of the light receiving-emitting element and temporal variation, and the measurement of toner image concentration without the influence of temporal variation of the surface status (contamination) of the transfer belt or photoreceptor. This adjustment value (an adjustment substitute against the fixed reference electric current value) is R which includes surface status (contamination) information on the transfer belt and photoreceptor.

Figure 10:
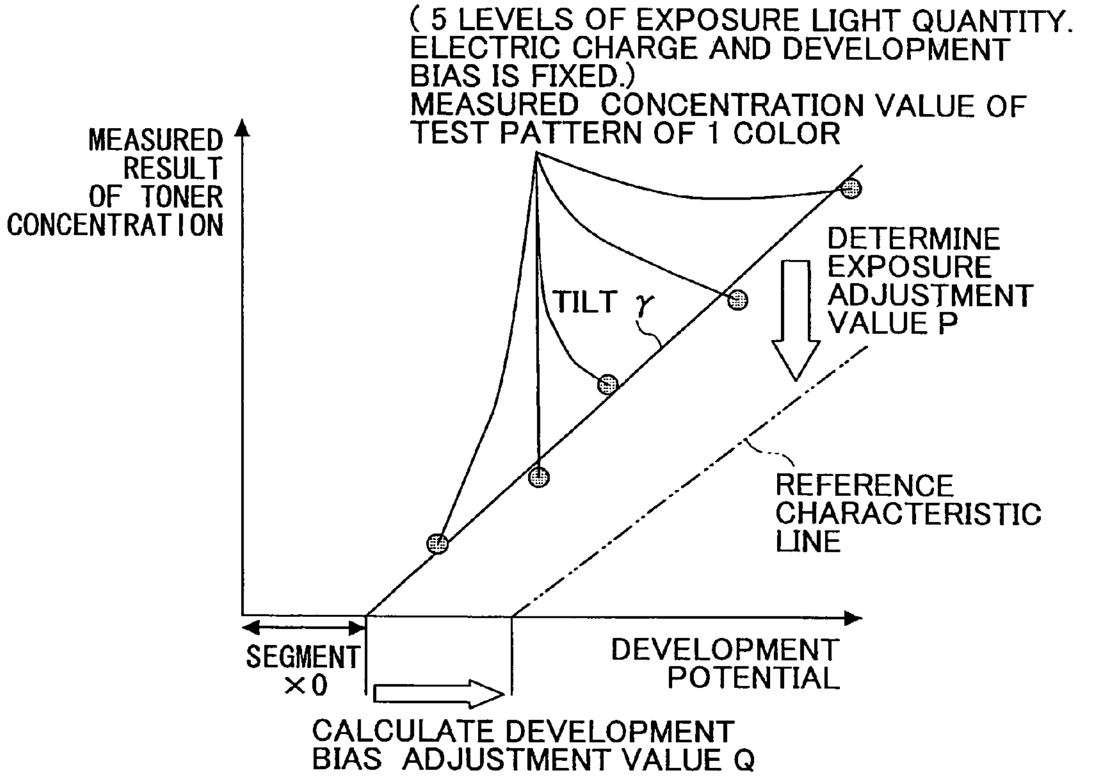
FIG. 10 is a graph illustrating the relationship of the development potential, at the time of image creation, of the test pattern toner transcribed upon the transfer belt 10 and detected toner concentration by the light sensors 81 and 82.

Next, the concentration test pattern marks (toner pattern: 83C1 and other shown in FIG. 5(*b*)) of five grades of each color is charged, development bias is set to the reference value, and is formed upon the photoreceptor and transcribed to the intermediate transfer belt 10 (S3). Then detection of a toner concentration of test pattern transferred to intermediate transfer belt 10 is executed. As shown in FIG. 10, from the five points of received-light signal of one color, the characteristic line or an approximate development potential/toner adherence quantity line tilt γ and segment×0 is calculated. Segment×0 is adjusted to the reference characteristic line segment and development bias adjustment and exposure quantity adjustment are conducted which adjusts tilt of γ to the reference characteristic line. At this time, the development bias adjustment value Q and exposure quantity adjustment value P are the adjustments from each reference value. These R, Q, and P are given a print number integrated value and stored in the NV-RAM within the engine control 510 (S6).

This example adjusts development bias and exposure light quantity though the same results can be acquired by adjusting the electric charge potential or transfer electric current, or the adjustment of other process control values which contribute to image concentration.

This process control is performed with the objective to adjust, within normal limits, the variation of temperature-humidity of charged toner quantity or the variation of sensitivity of the photoreceptor though there are cases, when a specific failure or a prediction of a failure occurs, where the measurement value or the parameter based upon the measurement value changes. For example, after transfer and at the retrieval of residual toner left upon the photoreceptor, with the objective to sustain normal electrical charge exposure, blade cleaning methods of a urethane blade rubbing the surface of the photoreceptor are often used, and due to this structure the passage of toner under the blade occurs. The toner passes the electric charge exposure section and is retrieved at a high rate at development. Though due to electric charge loss or a change of shape, due to friction with the blade, the toner cannot be retrieved at development, and non-statically adhere to the transfer body irrespective of image section or non-image section and is transferred. Thus a miniscule trace of toner particles can be seen adhering to the non-image section though this is not enough to impair image quality.

In the long term, removability of the blade declines by the contact point with the photoreceptor becoming worn and there is a drastic increase in the amount of toner passing. When a large amount of residual toner passes the blade, the charging ability of the charging apparatus declines due to the contamination by the toner, the exposure part function also declines due to the toner, and the development part are unable to retrieve this large amount of toner, and finally there occurs an abnormal image with vertical streaks, and a image failure needing repair.

Figure 11A:
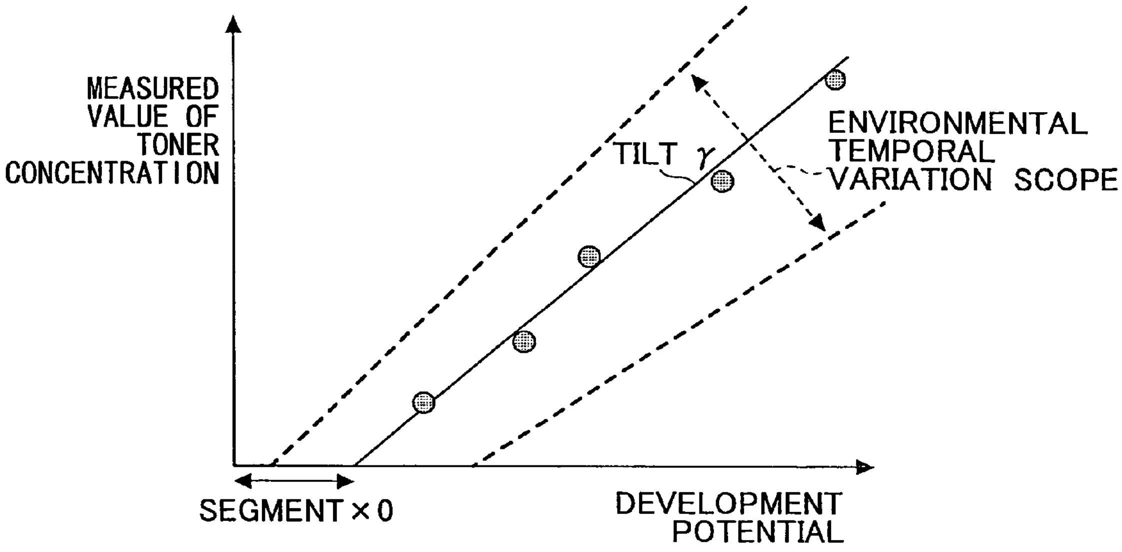
FIG. 11A is a graph illustrating the characteristic line measured when there is no extra contamination on the surface of the belt 10 and the variation range of the characteristic line.
Figure 11B:
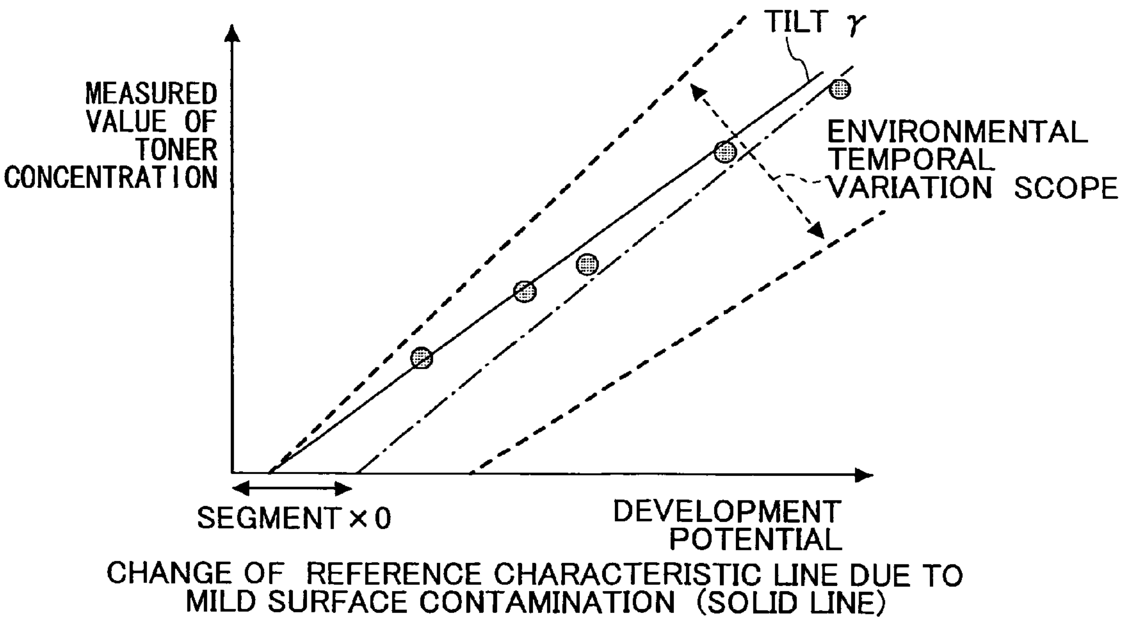
FIG. 11B is the characteristic line when there is a little contamination on the surface of the belt 10.
Figure 12:
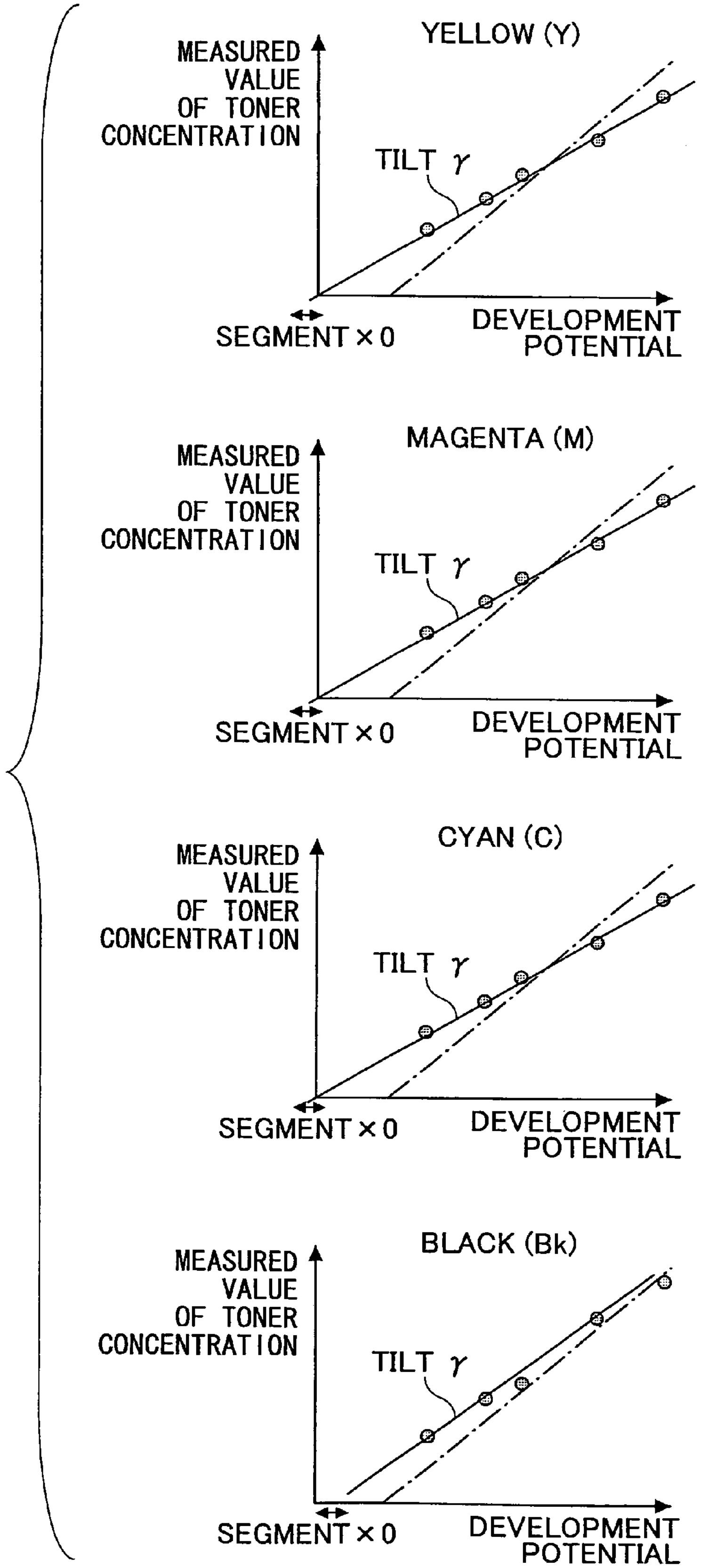
FIG. 12 is a graph illustrating the characteristic line of each color when the surface of the belt 10 is contaminated.

Before such a condition occurs there is a uniform increase in toner adherence quantity to the entire image support body though due to having no image degradation users do not notice at this stage. This condition is called “mild surface contamination” and is thought to be a predictive status of cleaner abnormality (cleaning failure). The existence of such toner, as shown in FIG. 11(*b*), affects especially the measurement results of the low concentration section and causes a slight decline of tilt γ and segment×0. The characteristic line of each color of this condition is shown in FIG. 12.

Generally there is little difference between the toner and the environmental temporal variation range of the photoreceptor, and this condition is extremely difficult to identify from γ and segment×0 of a single color or the adjustment parameters Q and P based upon this, so that building an accurate precursor alarm is difficult. Conventional apparatus identifiers remain in the realm of identifying failure that has deviated from normal activity or the sending out of an alarm of failure, and the predicting failure at an early stage is difficult.

Figure 13:
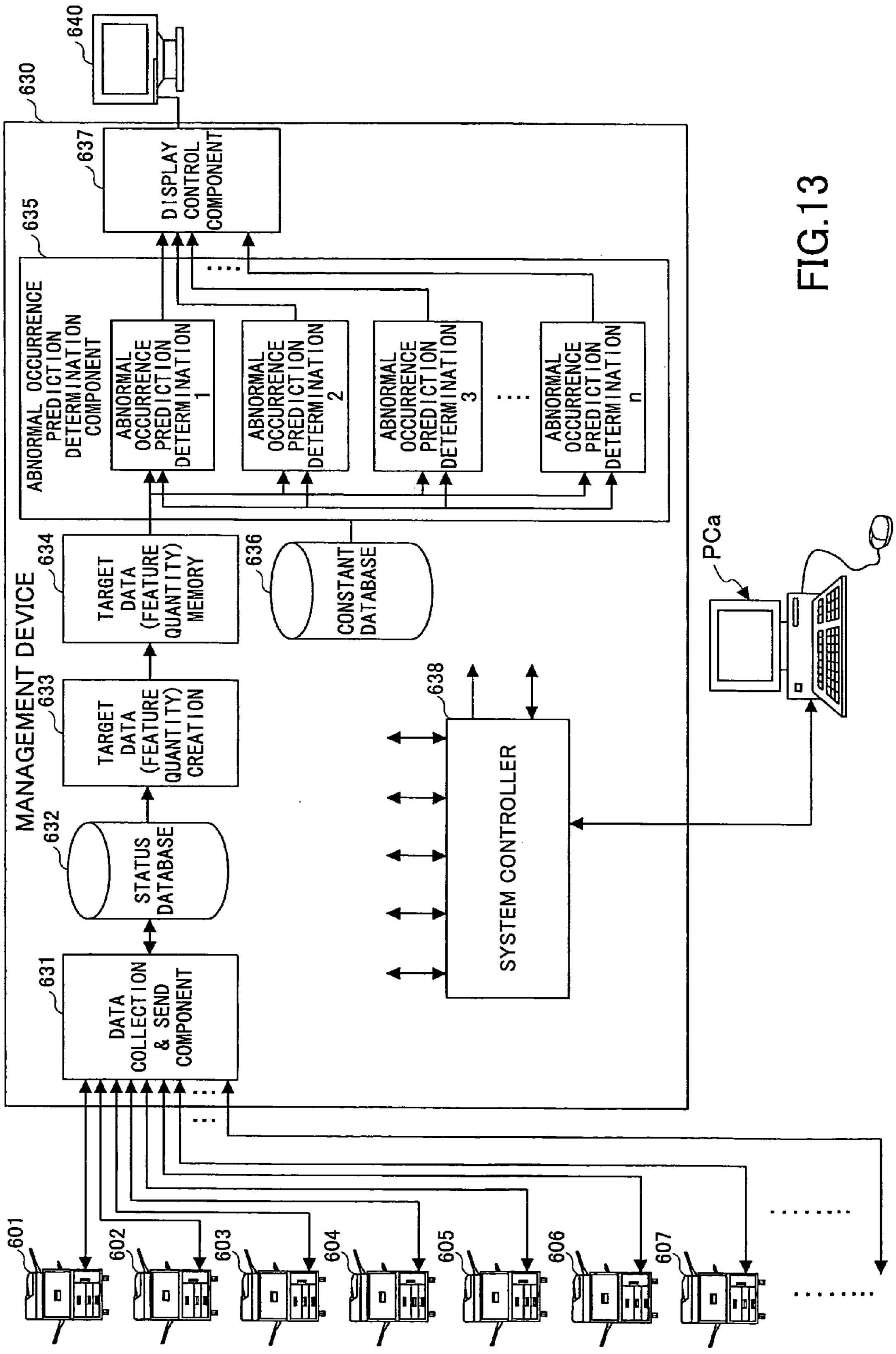
FIG. 13 is a block diagram illustrating the structure of the management device 630 illustrated in FIG. 1.

Shown in FIG. 13 is the structure of the management device 630. The data collection and delivery apparatus 631 of the management device 630, when receiving a communication from any of the copying machines 601-607, instructs the corresponding copying machine to send status data, and receives the entire status data of the corresponding copying machine. After receiving the data, the data collection and delivery apparatus 631 adds the data as a new file to the status database 632 of the corresponding copying machine. This is conducted on a large scale, where there are as many as a few thousand copying machines to communicate with and the status data of each copying machine are updated and stored in the status database 632. The inference engine that identifies predicted failure is comprised of a target data creation component 633, a target data memory 634, an abnormal occurrence prediction determination component 635, a constant database 636, and a display control component 637. Failure prediction determination is done based upon status data of the status database 632, and when abnormal occurrence prediction is identified an alarm is displayed on the display 640 to inform the operator of the management center where the management device 630 is located. The failure prediction determination is a calculation with comparatively few steps and can be performed by each copying machine though by performing this the management device 630, when improving the target data creation method (for example, feature quantity calculation method) and the determination constant, inference quality enhancement can be achieved in an single integrated fashion. Also due to structuring determination with a boosting method with relatively few steps, high speed sequential determination on an extensive log (stored status data) is possible. The application of this boosting method resolves the issue of execution time of conventional determination methods, which conduct first stage determination at the device and if necessary a second stage diagnosis that has a complicated management issue.

After a failure prediction determination is given from the inference engine and an alarm is sent to the operator, the operator informs the copying machine user to confirm status and arranges repair parts for the maintenance of the corresponding copying machine with the parts management system. The arrangement for a service engineer is done by contacting the call desk operator. The service engineer is dispatched to the location of the corresponding copying machine, and conducts the exchange of parts, repair, and such. Afterward an operations report is entered into the parts management system.

—Status Data Storage—

Figure 14:
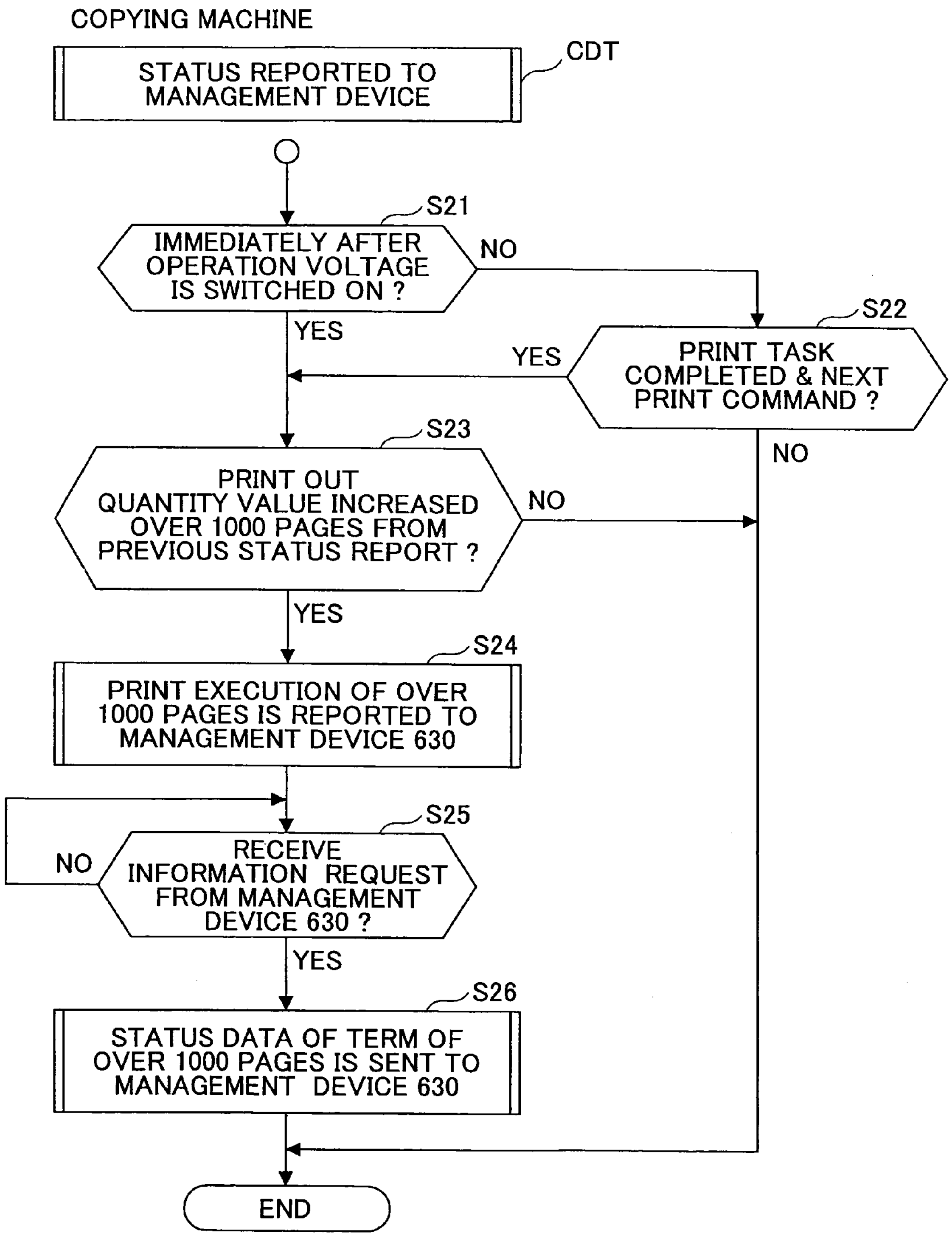
FIG. 14 is a flowchart of the sending operation of status data to the management device 630 from the copying machine 601 illustrated in FIG. 1.

Shown in FIG. 14 is an overview of the control for status data sending by the engine control 510 of the copying machine 601. After the engine control 510 is applied an operation voltage and initialization of each target part for control is completed and there is a waiting period for the next print command after completion of printing or copying (printing and copying hereinafter collectively referred to as copying). If the print number integrated value increase is over 1000 pages (S21~S23) from the previous transmission, the engine control 510 informs the management device 630 of the accumulated status data via the controller 501 of copying machine 601 (S24). In response to this the data collection and send component 631 of the management device 630 requests the transfer of the status data of the corresponding copying machine 601 and the controller 501 of the corresponding copying machine 601 sends to the management device 630 new status data, data accumulated after the previous transfer, stored in the NV-RAM of the engine control 510. The other copying machines conduct the same operation of sending new status data to the management device 630 as well. Note that the degradation of the mechanical parts and print numbers do not always correlate and thus a communication request to the management device 630 at a specified interval of motor running time may be conducted. If necessary, this communication interval may be set or adjusted to control the amount of data communicated.

—Abnormal Occurrence Prediction Determination—

Figure 15:
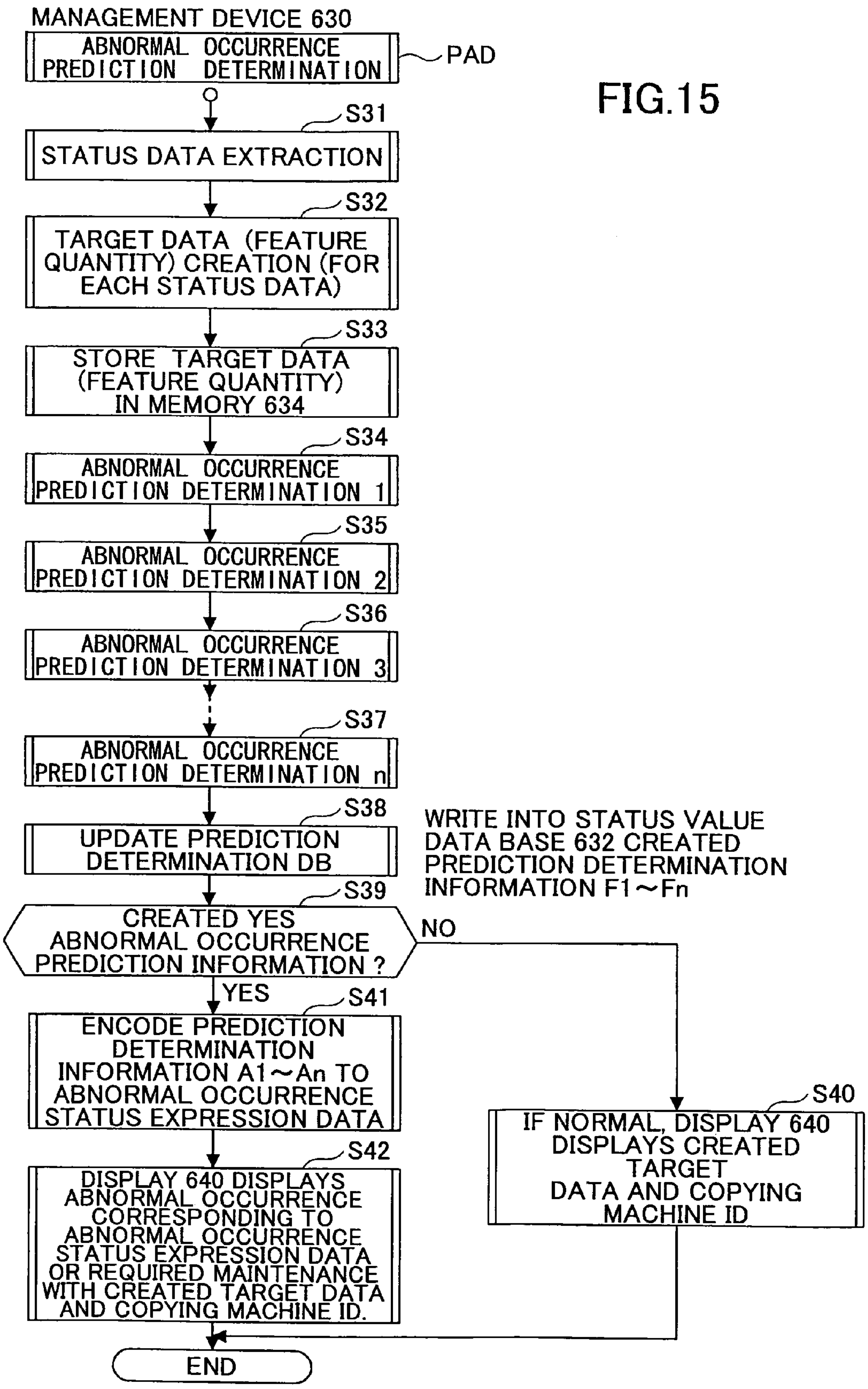
FIG. 15 is a flowchart illustrating the abnormal occurrence prediction determination executed by the management device 630 illustrated in FIG. 1.

Shown in FIG. 15 is an overview of the execution process of the system controller 638 of management device 630 of abnormal occurrence prediction determination. This determination is executed targeting the status data group of the corresponding copying machine within the status database 631 when there is a status data communication from a copying machine. The following example targets 31 types of status data within the corresponding status data group.

Figure 16:
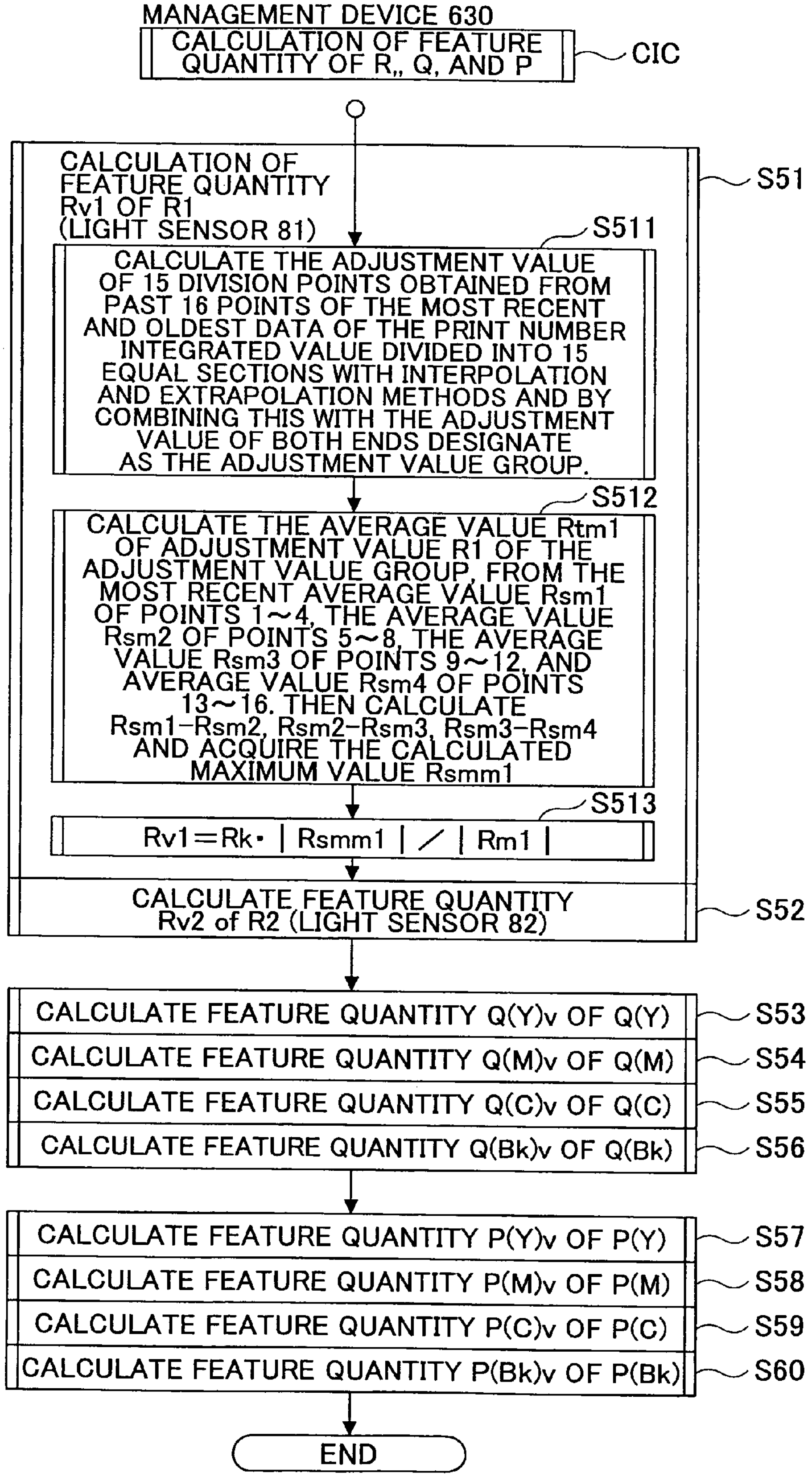
FIG. 16 is a flowchart illustrating the creation of target data (feature quantity) of radiant intensity adjustment value R, development bias adjustment value Q of each color, and exposure quantity adjustment value P of each color by the light sensors 81 and 82 at the copying machine 601.

At "Abnormal occurrence prediction determination" PAD, according to the calculated feature quantity within the target data creation component 633 of the inference engine of failure prediction determination, the management device 630 extracts, in a most recent to old order, a total of 16 points of status data R, Q, P within the 31 types of status data of the corresponding copying machine (S31) and for each status data value (R, Q, P) calculates the feature quantity (S32). In this example, the temporal distribution (change pattern) of the 16 points of status values is converted to an index value expressing feature. This conversion process is specified for each data value (R, Q, and P). Within the feature quantity as shown in FIG. 16 are 10 types of feature quantities Rv1, Rv2, Q(Y)v, Q(M)v, Q(C)v, Q(Bk)v, P(Y)v, P(M)v, P(C)v, and P(Bk)v. The "Abnormal occurrence prediction determination 1" S34 (explained below) uses only this feature quantity as target data for identifying cleaning insufficiency (Black cleaning insufficiency) of the photoreceptor 40 (Bk) for Bk image creation and/or cleaning insufficiency (including fixation of contamination) of the intermediate transfer belt 10.

Shown in FIG. 16 are only the calculated feature quantities of radiant intensity adjustment value R, development bias adjustment value Q, and exposure quantity adjustment value P. At the radiant intensity adjustment value R1 of the light sensor 81, both ends of the 16 points or the most recent and oldest data of the print number integrated value are divided into 15 equal sections and with interpolation and extrapolation methods the data value of each division point is calculated, and by combining this with the data of both ends is derived a new data group of 16 points (S511). Next, the average value Rm1 of the new 16 points, from the most recent average value Rsm1 of points 1~4, the average value Rsm2 of points 5~8, the average value Rsm3 of points 9~12, and average value Rsm4 of points 13~16 is calculated and then the differences Rsm1-Rsm2, Rsm2-Rsm3, and Rsm3-Rsm4 are calculated to acquire the maximum difference value Rsmm1 (S512). Then the feature quantity Rv1 of radiant intensity adjustment value R, Rv1=Rk·|Rsmm1|/|Rm1| is calculated (S513). Rk is the coefficient (fixed value) which adjusts the range of computational value. This is the calculation S51 of the feature quantity Rv1 of the radiant intensity adjustment value R1 of the light sensor 81. The calculation S52 of the feature quantity Rv2 of the radiant intensity adjustment value R2 of the light sensor 82, the calculation S53~S56 of the feature quantity Q(Y)v, Q(M)v, Q(C)v, and Q(Bk)v of the development bias adjustment value Q(Y), Q(M), Q(C), and Q(Bk) for toner concentration adjustment of each color, and the calculation S57~S60 of the feature quantity P(Y)v, P(M)v, P(C)v, and P(Bk)v of the exposure quantity adjustment value P(Y), P(M), P(C), and P(Bk) for toner concentration adjustment of each color are the same as the above-mentioned calculation S51 of the feature quantity Rv1.

Figure 17:
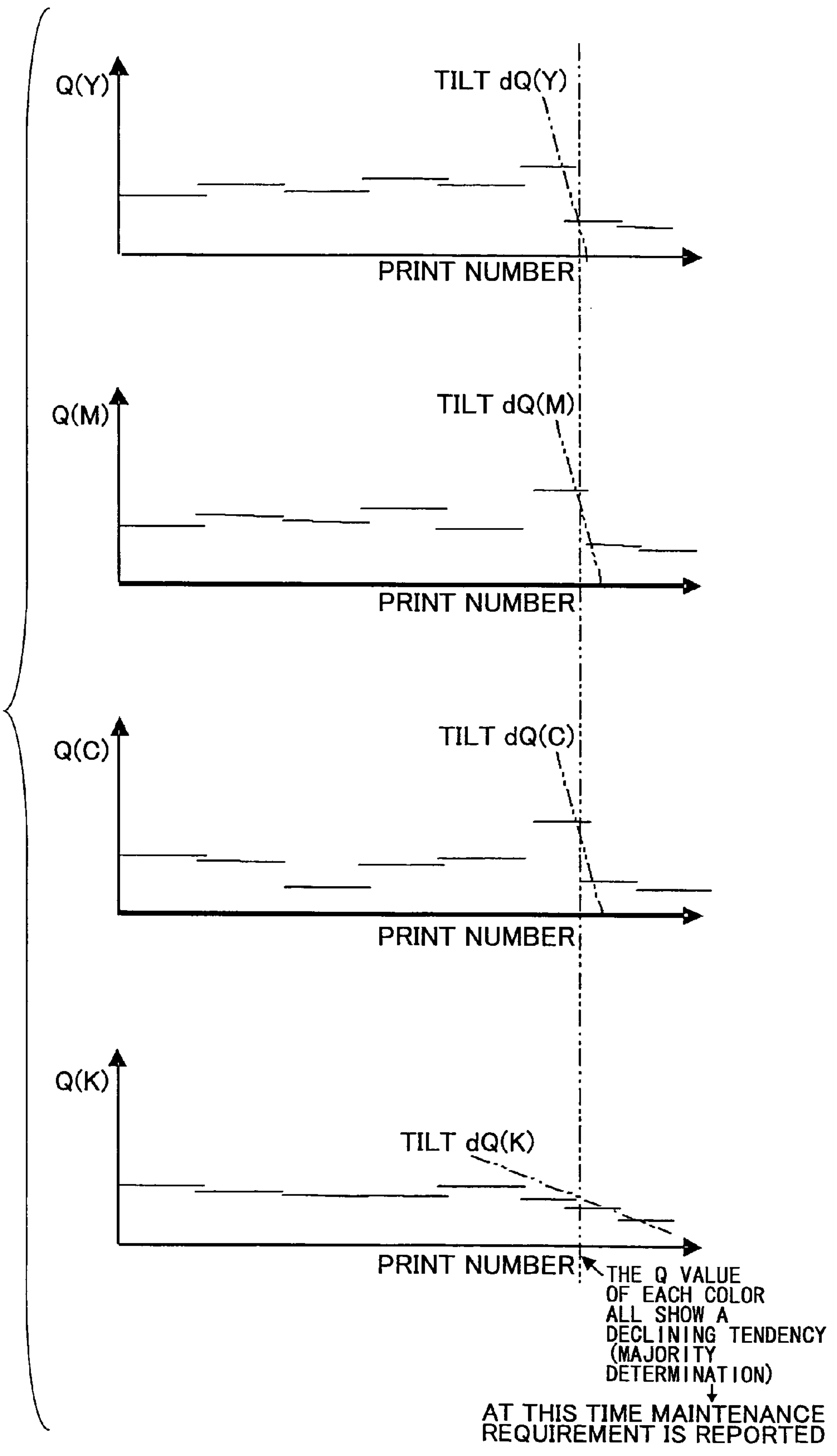
FIG. 17 is a graph illustrating the change of the development bias adjustment values Q(Y), Q(M), Q(C), and Q(Bk) of toner concentration adjustment for each color.

The calculated feature quantity of development bias adjustment values Q(Y), Q(M), Q(C), and Q(Bk) shown in FIG. 17 correspond to the tilt of adjustment value change or velocity.

These feature quantities are target data for abnormal occurrence prediction determination. The feature quantity of not only the difference value but regression value of signal change or the standard deviation value of the multiple data groups of the most recent section, average value, and maximum value can be acquired with various calculation methods. Many feature extraction methods of such chronological signals are proposed, such as the ARIMA model, and may be used when appropriate.

Prediction of abnormal occurrence is thought to be possible by detecting peculiar unstable movement, in various forms, of signals which when normal are stable. One should select the appropriate feature quantity extraction method from this viewpoint. The indicator of time passage is not confined to the print number integrated value but also can be operation time integrated value or actual time passage value. The inclusion of a feature quantity with no time calculation or the status data themselves to target data of abnormal occurrence prediction determination does not detract merit from the embodiment of the invention. For example, the addition of the detected status value to the target data is possible. More specifically, target data of abnormal occurrence prediction determination are feature quantity created based upon status data and/or status data or both.

Referring again to FIG. 15, target data of feature quantity created from calculation and other created data are stored in the target data memory 634 (S33). By using some or all of target data from the created target data group, according to this example, abnormal occurrence prediction determination S34~S37 for multiple n types are executed.

Figure 18:
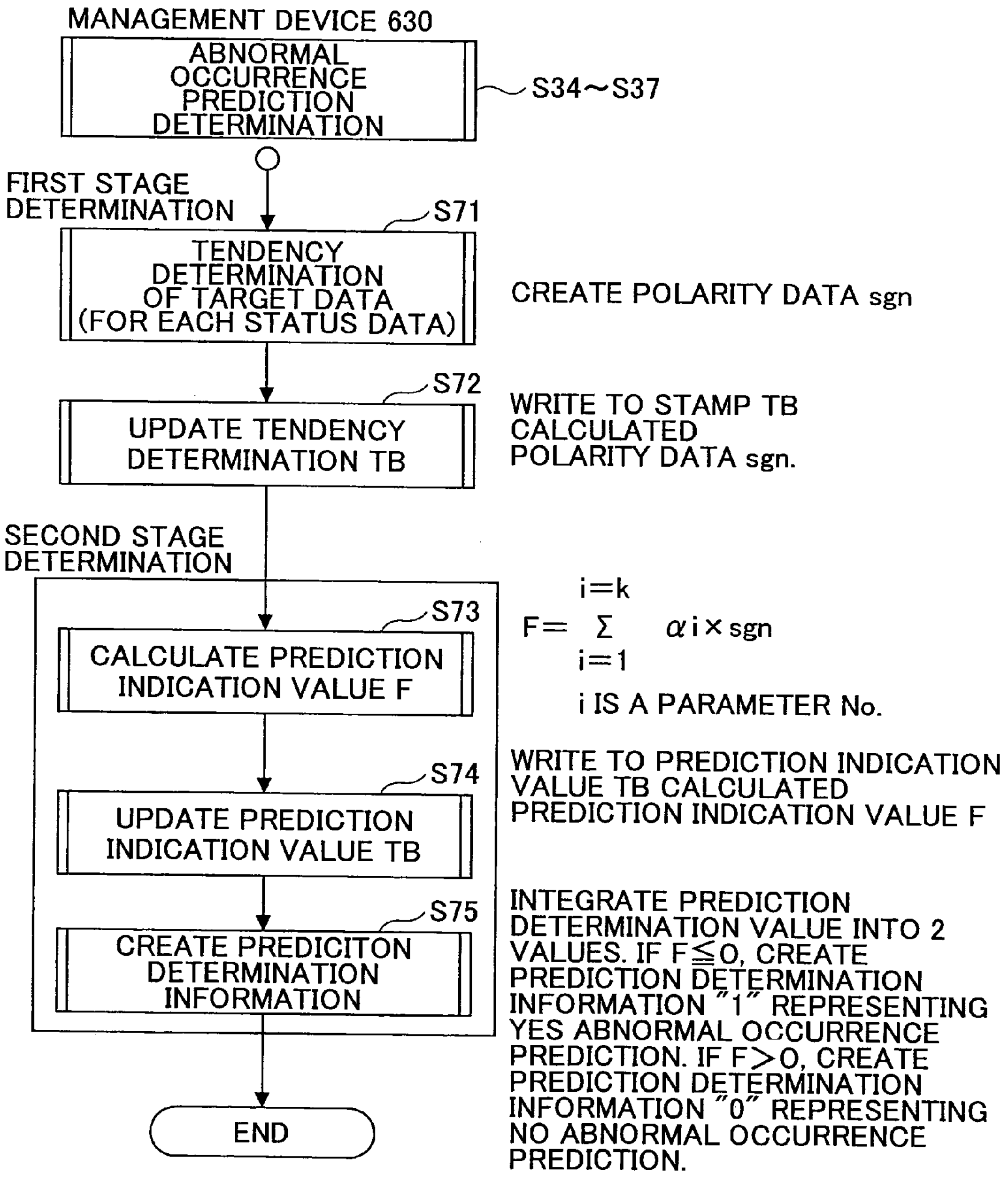
FIG. 18 is a flowchart illustrating data processing common to abnormal occurrence prediction determination 1~n illustrated in FIG. 15.

Shown in FIG. 18 is the common process configuration of abnormal occurrence prediction determination S34~S37. At each abnormal occurrence prediction determination, the determination of the tendency of each calculated target data addressed to the corresponding abnormal occurrence prediction determination is executed (S71) and the tendency determination results are stored in a tendency determination table (RAM 1 area within the device 630) addressed to the corresponding abnormal occurrence prediction determination (S72). At this tendency determination, only the distinguishing of whether each target data amount is larger or smaller than the reference value for each target data amount is executed by stamp determination, which is the first stage determination method. More specifically, each target data amount with the corresponding prediction determination reference data table (FIG. 19) addressed to and stored in the corresponding abnormal occurrence prediction determination table within the constant database 636, according to the prediction determination reference table addressed to the abnormal occurrence prediction determination (any of 1~n) now in execution, is integrated into 2 values of, if status data type (No.; for example, corresponding R, Q, P) is below reference value b a NO abnormal occurrence tendency ("0") is given and if it is above reference value b a YES abnormal occurrence tendency ("1") is given.

Next the second stage determination method conducts a majority logic calculation with the weighted tendency determination results (S73). More specifically, the calculation adds the weight a, a negative (−) for tendency determination result "1" (YES abnormal occurrence tendency) and a positive (+) for tendency determination result "0" (NO abnormal occurrence tendency), addressed to each target data type of the prediction determination reference data table (FIG. 19). Polarity data are represented as sgn. Addition value is represented as prediction indication value F. Prediction indication value F is stored in prediction indication value table (RAMI area within device 630) addressed to abnormal occurrence prediction determination (S74). When the corresponding prediction indication value F is below 0, prediction determination information A: "1" which represents YES abnormal occurrence prediction is created and when it is above 0 a prediction determination information A: "0" which represents NO abnormal occurrence prediction is created (S75).

Figure 22:
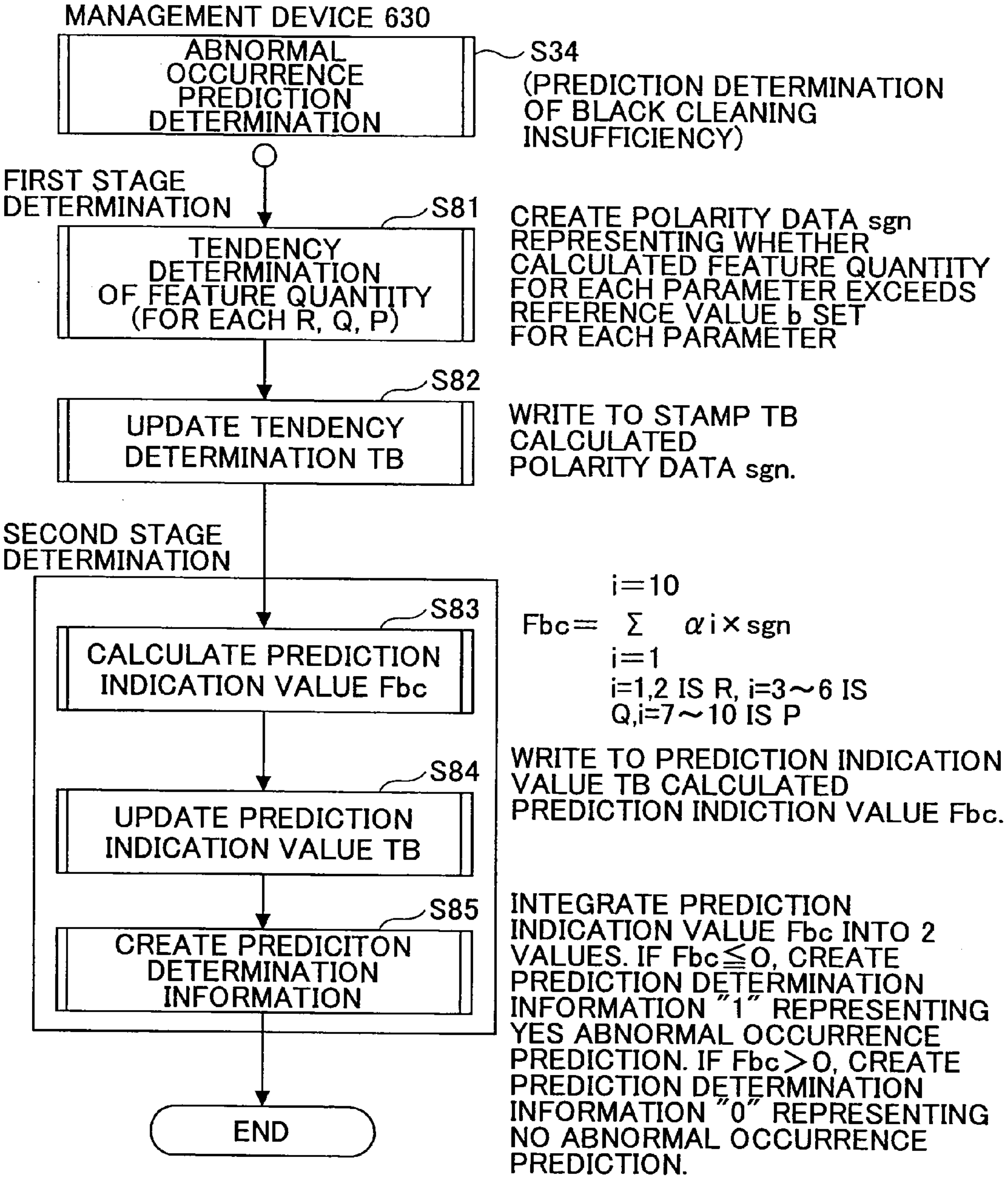
FIG. 22 is a flowchart illustrating the contents of abnormal occurrence prediction determination 1 included in FIG. 15.

Shown in FIG. 22 is the process of the first "abnormal occurrence prediction determination 1" S34 of the abnormal occurrence prediction determination S34~S37. At "abnormal occurrence prediction determination 1" S34, each calculated target value (feature quantity) Rv1, Rv2, Q(Y)v, Q(M)v, Q(C)v, Q(Bk)v, P(Y)v, P(M)v, P(C)v, and P(Bk)v is addressed to the prediction determination reference data table of "abnormal occurrence prediction determination 1" and integrated into 2 values showing, if the value is below reference value b (No.1~10) a NO abnormal occurrence tendency ("0") is given and if it is above reference value b a YES abnormal occurrence tendency ("1") is given (S81). The prediction determination reference data table used in this case is the same as the one shown in FIG. 19 though the status information No. of target data (feature quantity) Rv1, Rv2, Q(Y)v, Q(M)v, Q(C)v, Q(Bk)v, P(Y)v, P(M)v, P(C)v, and P(Bk)v are given each a number 1~10. Therefore reference value b is b1~b10.

Figure 20:
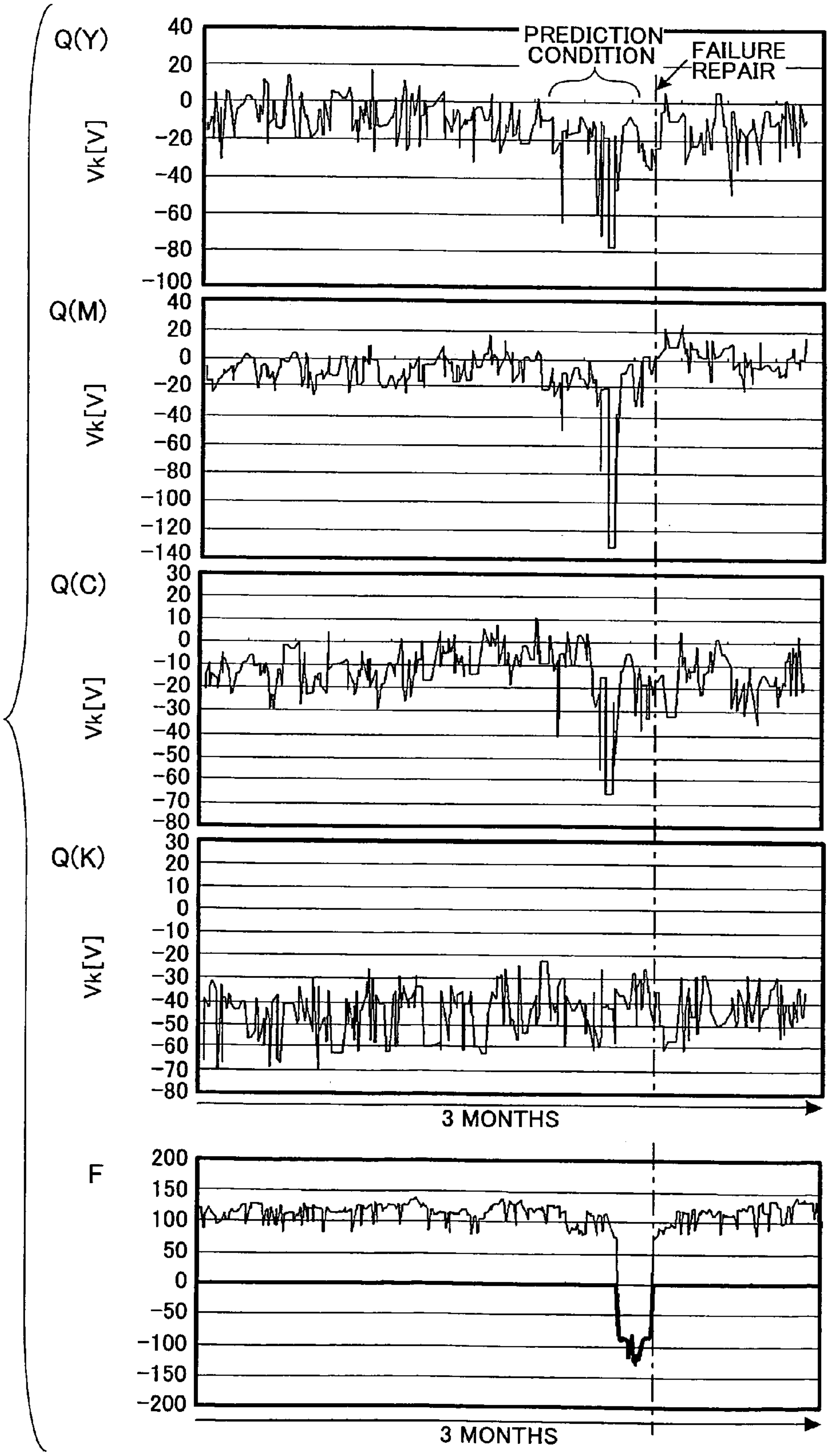
FIG. 20 is a graph illustrating the calculated prediction indication value F of the abnormal occurrence prediction determination component based upon the variation of the development bias adjustment value Q of image creation for each color of copying machine 601.
Figure 21:
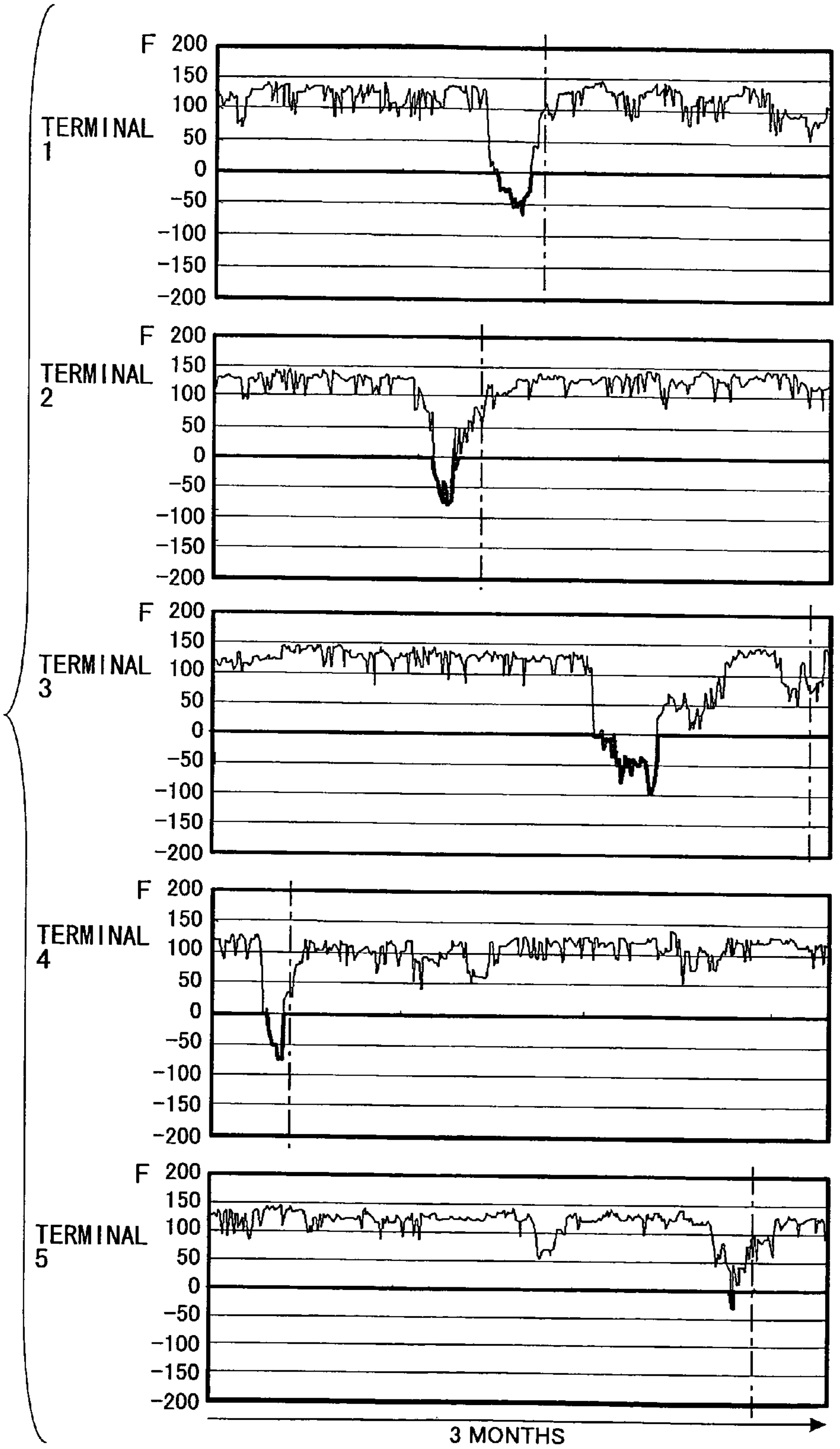
FIG. 21 is a graph illustrating the change of the prediction indication value F of five copying machines.

Next the second stage determination method conducts a majority logic calculation with the weighted tendency determination results (S83). More specifically, the calculation adds the weight a ($\alpha$1~$\alpha$10), a negative (−) for tendency determination result "1" (YES abnormal occurrence tendency) and a positive (+) for tendency determination result "0" (NO abnormal occurrence tendency), addressed to each target data type of the aforementioned prediction determination reference data table. Polarity data are represented as sgn. Addition value is represented as prediction indication value Fbc. Prediction indication value Fbc is stored in the prediction indication value table 1 addressed to abnormal occurrence prediction determination 1(S84). An example of prediction indication value Fbc is shown at the bottom of FIG. 20 and a few others are shown in FIG. 21. When corresponding prediction indication value Fbc is below 0 prediction determination information A1: "1" which represents YES abnormal occurrence prediction is created and when it is above 0 prediction determination information A1: "0" which represents NO abnormal occurrence prediction is created (85).

Referring again to FIG. 15, the 31 types of target data created at step S32 are cleaning insufficiency, image abnormality, paper-stop abnormality against the transfer paper, toner insufficiency, and hardware abnormality, and such; these are divided into the abnormal occurrence prediction determination groups (note there are target data that belong to multiple groups) and at the "abnormal occurrence prediction determination 1" S34 the 10 types of target data (feature quantity) Rv1, Rv2, Q(Y)v, Q(M)v, Q(C)v, Q(Bk)v, P(Y)v, P(M)v, P(C)v, and P(Bk)v are used (group to identify the prediction of cleaning insufficiency). In "abnormal occurrence prediction determination 2" S35~"abnormal occurrence prediction determination n" S37 image abnormality, paper-stop abnormality against the transfer paper, toner insufficiency, and hardware abnormality and other abnormalities are identified.

Referring again to FIG. 15, when abnormal occurrence prediction determination 1 to n is executed by the inference engine of failure prediction determination of the management device 630, at the "abnormal occurrence prediction determination" PAD displays, if produced prediction determination information A1~An of determination numbers 1~n are all "0" (NO abnormal occurrence prediction) (S39), data showing all is normal, created target data, and the copying machine ID are displayed on display 640 (S40). If there is a "1" (YES abnormal occurrence prediction) within created prediction determination information numbers A1~An (S39), data is encoded into data showing prediction (tendency) of abnormal status (cleaning insufficiency, image abnormality, paper-stop abnormality against the transfer paper, toner insufficiency, and hardware abnormality and other) (S41), the corresponding abnormal occurrence prediction or the maintenance requirements necessary to resolve the corresponding abnormal occurrence prediction, the calculated feature quantity, and the copying machine ID are displayed on display 640.

The engine control 510 of the copying machine 601, after there is an initialization input of completion of repair with the operations board 500, executes an exception process to avoid mis-determination of the abnormal occurrence prediction status due to excessive change of the target data after repair. According to this example, the exception process adds to the status data the repair complete element and writes to the status database (NV-RAM). The target data creation 633 of the management device 630, in step S31 where status data of 16 points are extracted, when revised data are found, does not execute tendency determination for each of the target data creation and prediction determination numbers 1~n of step 32 related to corresponding status data, and designates a NO abnormal occurrence ("0") to the tendency determination data of corresponding status data.

When the engine control 510 of the copying machine 601 recognizes abnormal occurrence in collected status data, the abnormal occurrence is displayed upon the display of the operations board 500 and at the same time the status data set of the time of occurrence, abnormality content (abnormality configuration), and the occurrence of abnormality is sent to the management device 630. The data collection and sending component 631 of the management device 630 stores the received information in the corresponding copying machine's status database and displays the information pertaining to abnormality on the display 640. There is a possibility this "abnormality" may be a non-target of the prediction detection of the abnormal occurrence prediction determination PAD and there may be an insufficient adjustment to the reference value or weight value. To compensate for this there is a prediction determination reference table update function (program) which enables the change of each reference value and each weight value of the constant data table within the management device 630 by an operator with administrator rights inputting, to computer PCa, revised adjustments.

The management device 630, by communication and cooperation with the operator with administrator rights, based upon status data collected from the multiple copying machines of the same type in the status database 632, to detect (identify) an abnormal occurrence prediction notification from a copying machine in which the management device 630 has not identified prediction of abnormality, creates (revise) the tendency determination (first stage determination) of the failure prediction determination (1~n) which is the most accessible for prediction determination of corresponding abnormal occurrence and the reference value b and weight a of prediction determination (second stage determination), and then creates a prediction determination reference table including the foregoing and rewrites the corresponding prediction determination reference table of the constant database. In doing so the management device 630 conducts abnormal occurrence determination prediction for the copying machine which reports abnormality there after.

According to the above-mentioned "abnormal occurrence prediction determination" PAD, the 3 values which define the determination process are reference value b of the stamp determination of each target data, the weight sign (sgn) when it is larger than the reference value, and weight a. A majority determination with weight is a very small process with little work load due to being a calculation of Σ s g n×α, where a large weight value a is given to highly influential target data.

EXAMPLE 1

In the following is an explanation of the creation of the prediction determination reference table (FIG. 19). The prediction determination reference table in the management device 630 is one created with a boosting method, a learning algorithm with a teacher. Boosting methods are publically known and explained in, for example, "Statistical pattern determination in information geometry" in Mathematical Science No. 489, March 2004. First one prepares status data of the kind where one knows that the status is normal and status data where one knows there is an abnormal occurrence prediction. For example, when conducting endurance testing for a device a status data log is taken and when one encounters an anomaly, the term prior to the anomaly or a prediction state period is estimated and used for the above data. The inventors collected and verified status data logs and anomaly examples for a span of 3 months with over 10 image forming apparatuses.

Q(Y), Q(M), Q(C), and Q(K) shown in FIG. 20 are the recorded results of the change of the development bias adjustment value Q for each color over a span of 3 months after an occurrence of a cleaning failure and repair in a copying machine operating in the market place. Many other types of status information are recorded and used as well, though due to the significant change in status information Q (development bias adjustment value) it was chosen to be introduced. As can be seen, the change in development bias adjustment value in Y, M, and C prior to cleaning failure of the color Bk can be observed.

Target data creation (including feature quantity calculation) was conducted with the steps (S32, S51). From the created 31 target data types, a chart wherein the few types of created target data types or all target data j for "abnormal occurrence prediction determination" (1 of 1~n) is plotted with the horizontal axis being the print number integrated value. Then with visual observation abnormal occurrence prediction term estimation was conducted and a label −1 (abnormal occurrence prediction term) was applied to the terms that correspond to the abnormal occurrence prediction term and to the other parts a label 1 (normal term) was applied. Then conduct boosting for j times to learn and b1·bj, sgn1~sgnj, and a1~aj was determined. Corresponding b1~bj and a1~aj are designated as the prediction determination reference table. Shown in FIG. 19 is an example of a prediction determination table when j=31. Shown in FIG. 19 is an example of the results of the F value calculated with the corresponding prediction determination reference table after Q(K). The teacher attached labeled data showed proper learning and created a weak determination component (First stage determination method: S71, S81) where only the corresponding prediction section changes to a minus F value and a strong determination component (Second stage determination method: S73~75, S83~85) where a weight is attached for majority determination. Next, shown in FIG. 21 are results of the determination components working with test data not learned to see if the components produce appropriate results. Employed are 5 terminals (terminal 1~terminal 5) with status information showing the same anomaly occurring and with the same steps extracted feature quantity and later verified. The determination component output F value, which was calculated with previously determined b and a, showed, as intended before anomaly occurrence a minus change to the abnormal occurrence prediction status and confirmed proper prediction determination.

EXAMPLE 2

The hardware of the management system in example 2 is the same as example 1. In example 2, the management device 630 and the operator conduct cooperative operation via computer PCa and based upon part of or all of the 31 types of target data created in example 1, to detect prediction determination for an anomaly not identified until reported by the copying machine, from the status data collected from identical copying machines stored in the status database 632, a tendency determination (first stage determination) and a prediction determination (second stage determination) using reference value b and weight α and in an embodiment like the above prediction determination reference table is created. Then with the added prediction determination reference table and target data which use the corresponding added prediction determination reference tables for abnormal occurrence tendency determination (first stage determination), weight attached majority determination prediction determination (second stage determination), and display response of prediction determination results, additional abnormal occurrence prediction determination results are created and are built-in to the inference engine of the failure prediction determination. Afterward when the inference engine creates target data groups, abnormal occurrence prediction determination 1~n of example 1 and additional abnormal occurrence prediction determination are executed serially. The other structures and functions of example 2 are identical to the example 1.

EXAMPLE 3

The hardware of the management system in example 3 is the same as the above-mentioned example 1. In example 3, the management device 630 creates an abnormal occurrence prediction determination which refers to not only the status data to create the 31 types of target data but other status data as well. More specifically, the management device 630 and the operator conduct cooperative operations via computer PCa and based upon status data of identical copying machines collected within status database 632, other than part of or all of the 31 types of target data mentioned in example 1, additional types of target data based upon status data other than that of the 31 types are calculated. To identify prediction of anomaly not identified until reported by the copying machine with a new target data group, reference value b, and weight a, a prediction determination reference table like the above embodiment was created. With this additional prediction determination reference table and target data which use the corresponding added prediction determination reference tables for abnormal occurrence tendency determination (first stage determination)and weight attached majority determination prediction determination (second stage determination) the response of prediction determination results is displayed and additional abnormal occurrence prediction determination types are created and are built-in to the inference engine of the failure prediction determination. Also at "target data creation" S32 of existing "Abnormal occurrence prediction determination" PAD target data related to added status data from the added abnormal occurrence prediction determination are calculated and rewritten.

After adding additional abnormal occurrence prediction determination in like manner, when calculating the target data groups (S32), the abnormal occurrence prediction determination 1~n of example 1 and the added abnormal occurrence prediction determination are executed serially. The other structures and functions of example 3 are identical to example 1.

EXAMPLE 4

The hardware of the management system in example 4 is the same as example 1. The management device 630 in example 4 identifies system error of the management system which includes multiple copying machines and corresponding management device 630.

Figure 23:
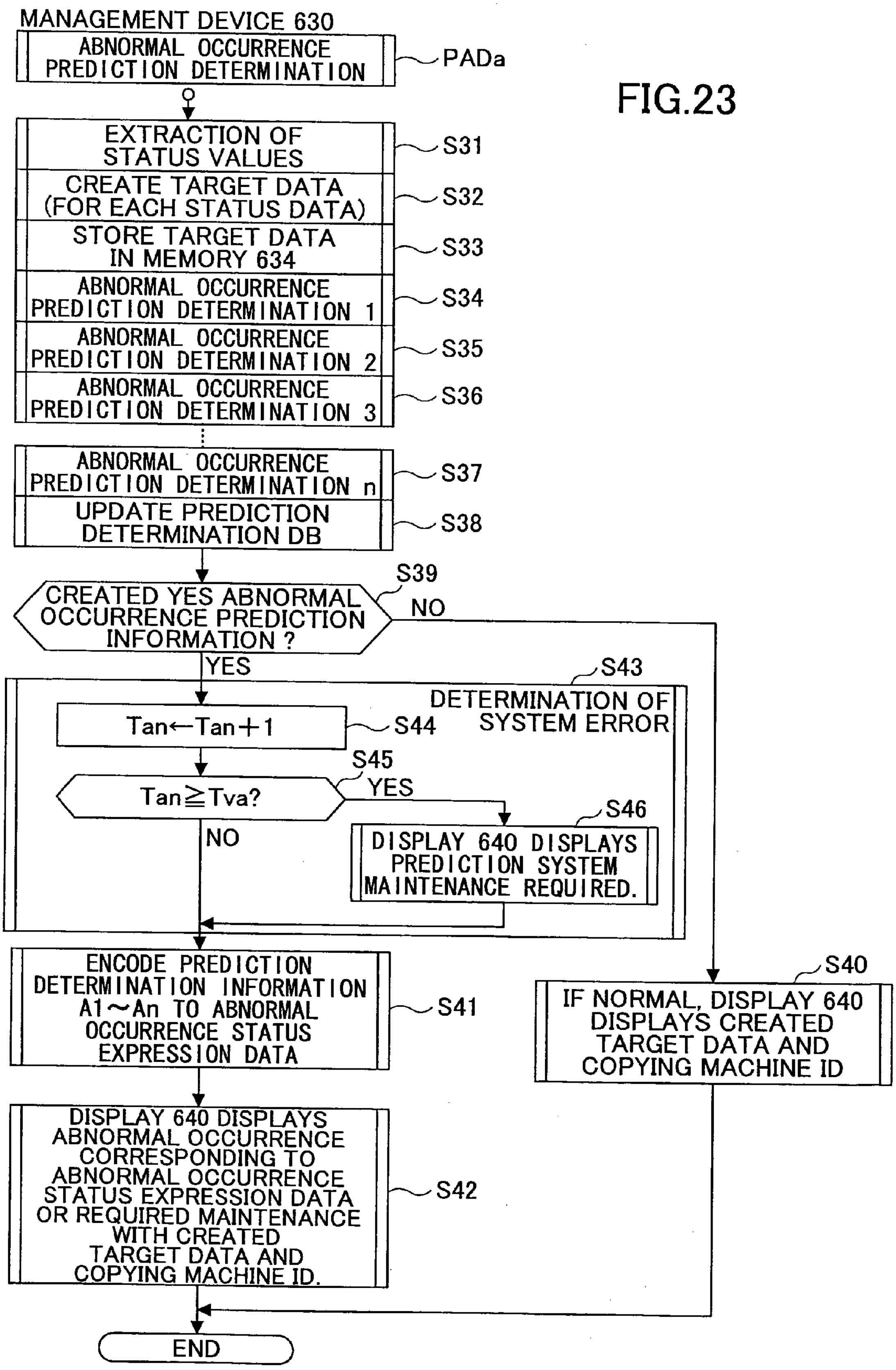
FIG. 23 is a flowchart illustrating the overview of abnormal occurrence prediction determination executed by management device 630 in example 4.

Shown in FIG. 23 is an overview of the "Abnormal occurrence prediction determination" PADa of management device 630 of example 4. As a result of executing abnormal occurrence prediction determination 1~n, if there is a "1" (YES abnormal occurrence) within the created prediction determination information A1~An (S39), the system controller 638 of management device 630 adds this to the number of realized abnormal occurrence Tan registered in status database 632 for the whole copying machine group and updates (S44). If the number Tan exceeds the set value Tva, prediction system checkup necessary is shown on display 640. The other structures and functions of example 4 are identical to example 1.

In the above-mentioned examples, a pair of failure prediction determination inference engines (target data creation 633, target data memory 634, abnormal occurrence prediction determination component 635, and constant database 636) executes multiple abnormal occurrence prediction determination 1~n serially. Concurrent (simultaneous/parallel) execution of n sets of failure prediction determination inference engines is possible with the placement of more n sets for abnormal occurrence prediction determination 1~n or, if necessary, the placement of more multiple sets of failure prediction determination inference engines.

Although the invention has been described with respect to specific embodiments for a complete and clear disclosure, the appended claims are not to be thus limited but are to be construed as embodying all modifications and alternative constructions that may occur to one skilled in the art that fairly fall within the basic teachings herein set forth.

This patent application is based on Japanese Priority Patent Application No. 2007-20320 filed on Aug. 3, 2007, the entire contents of which are hereby incorporated herein by reference.

What is claimed is:

1. An apparatus, comprising:

a receiving unit configured to receive a state information including multiple types of statuses of a communication device from the communication device;

a calculating unit configured to calculate a value indicating whether the communication device is abnormal based on the state information including the multiple types of the statuses of the communication device; and a determining unit configured to determine whether the communication device is abnormal based on the calculated value.

2. The apparatus of claim 1, wherein the multiple types of statuses include control parameter values influencing image creation characteristics, detection data of a status sensor, and evaluation data created from the detection data.

3. The apparatus of claim 1, wherein the calculating unit includes a target data creation unit that creates multiple types of target data based upon said multiple types of statuses, and the target data creation unit includes a feature extraction section configured to create target data showing the transition configuration of multiple points of the statuses on a time scale present to past.

4. The apparatus of claim 1, wherein the determination unit includes a plurality of first stage determination units and a plurality of second stage determination units provided as multiple pairs, each pair including one of the plurality of first stage determination units and one of the plurality of second stage determination units, and each of the multiple pairs executes a determination of whether the apparatus is abnormal , sequentially.

5. The apparatus of claim 1, wherein the determination unit includes a plurality of first stage determination units and a plurality of second stage determination units provided as multiple pairs, each pair including one of the plurality of first stage determination units and one of the plurality of second stage determination units, and each of the multiple pairs executes a determination of whether the apparatus is abnormal, concurrently.

6. The apparatus of claim 1, wherein the determination of whether the communication device is abnormal performed by the determining unit is converted into output data.

7. The apparatus of claim 6, further comprising:

a notification section configured to output notification corresponding to said output data.

8. The apparatus of claim 3 further comprising:

the communication device with a photoreceptor, a charging part configured to electrically charge the photoreceptor, an exposure part configured to irradiate image light upon the charged surface of the photoreceptor, a development part configured to develop the toner image on the electrostatic latent image formed upon the photoreceptor by the exposure part, a transfer part configured to transfer the toner image to a paper via an intermediate transfer body, a light sensor configured to detect a toner image concentration transferred to the intermediate transfer body, a light sensor radiant intensity adjustment part configured to set, as a reference value, the light receiving level of the light sensor to the level of light projected by the light sensor and reflected from the surface of the intermediate transfer body, and a toner image concentration adjustment part wherein said light sensor generates a detection value by detecting the toner image concentration of a test pattern transferred to said intermediate transfer body and, based upon the detection value, the toner image concentration adjustment part adjusts a development bias of said development part and an exposure quantity of said exposure part; wherein said multiple types of statuses may have a radiant intensity adjustment value R from said light sensor radiant intensity adjustment part, an exposure quantity adjustment value P and a developing bias adjustment value Q from said toner image concentration adjustment part, said feature extraction section creates target data which show a data transition configuration of multiple points of the adjustment values R, Q, and P, respectively, on a time scale from present to past, and the determining unit generates a second stage determination result indicating abnormal occurrence prediction of said adjustment values R, Q, and P as a whole with majority logic using first stage determination results of the target data of said adjustment values R, Q, and P of the determining unit.

9. The apparatus of claim 8, further comprising:

a conversion part configured to convert said second stage determination result of abnormal occurrence prediction indication as a whole to cleaning insufficiency prediction indication.

10. The apparatus of claim 1, wherein in a case where a status, from among the multiple types of statuses, showing a repair completed element is found for the communication device within the status data received and stored in the status database from said communication device, said target data creation unit puts on hold target data creation of corresponding status data, and the first stage determination unit determines no abnormal occurrence tendency to the corresponding status data as an determination result.

11. The apparatus of claim 1, further comprising a first stage update part configured to update reference values given to said status data used by a first stage determination unit included in the determining unit.

12. The apparatus of claim 1, wherein the determining unit includes a first stage determination unit and a second stage determination unit, and the apparatus further includes a second stage update part configured to update weight values given to said status data used by the second stage determination unit included in the determining unit.

13. An apparatus, comprising:

a receiving unit configured to receive a state information including multiple types of statuses of a communication device from the communication device;

a judging unit configured to judge whether each of the multiple types of statuses of the communication device reaches a reference value based on the state information received by the receiving unit;

a calculating unit configured to calculate a sum of results from the judging unit; and a determining unit configured to determine whether the communication device is abnormal based on the sum of results.

14. An apparatus, comprising:

a receiving unit configured to receive a state information including multiple types of statuses of a communication device from the communication device, the multiple types of statuses including status types based on each of a radiant intensity adjustment value, a development bias value, and an exposure quantity adjustment value, respectively;

a calculating unit configured to calculate a value indicating whether the communication device is abnormal based on the state information including the multiple types of the statuses of the communication device; and a determining unit configured to determine whether the communication device is abnormal based on the calculated value.

* * * * *